United States Patent
Giuliano et al.

(10) Patent No.: US 12,212,232 B2
(45) Date of Patent: Jan. 28, 2025

(54) POWER SUPPLY FOR GATE DRIVER IN SWITCHED-CAPACITOR CIRCUIT

(71) Applicant: pSemi Corporation, San Diego, CA (US)

(72) Inventors: David Giuliano, Bedford, NH (US); Gregory Szczeszynski, Nashua, NH (US); Raymond Barrett, Jr., Merrimack, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 18/544,466

(22) Filed: Dec. 19, 2023

(65) Prior Publication Data

US 2024/0120835 A1    Apr. 11, 2024

Related U.S. Application Data

(63) Continuation of application No. 18/487,119, filed on Oct. 16, 2023, now Pat. No. 11,901,818, which is a
(Continued)

(51) Int. Cl.
H02M 3/07    (2006.01)
H02M 1/088   (2006.01)

(52) U.S. Cl.
CPC ............ *H02M 3/07* (2013.01); *H02M 1/088* (2013.01); *H02M 3/073* (2013.01)

(58) Field of Classification Search
CPC ......... H02M 1/088; H02M 3/07; H02M 3/073
See application file for complete search history.

(56) References Cited

U.S. PATENT DOCUMENTS

| 3,370,215 A | 2/1968 | Light, Jr. |
| 3,745,437 A | 7/1973 | Brown |

(Continued)

FOREIGN PATENT DOCUMENTS

| CN | 20148028501 | 12/1899 |
| CN | 1057410 A | 1/1992 |

(Continued)

OTHER PUBLICATIONS

U.S. Appl. No. 13/837,796, filed Mar. 15, 2013, 44 pages, Doc 8078.
(Continued)

*Primary Examiner* — Jue Zhang
*Assistant Examiner* — Lakaisha Jackson
(74) *Attorney, Agent, or Firm* — Haynes and Boone, LLP

(57) ABSTRACT

An apparatus includes first and second pluralities of switches, a controller for controlling these switches, gate-drivers for driving switches from the first plurality of switches, and first and second terminals configured for coupling to corresponding first and second external circuits at corresponding first and second voltages. During operation, the controller causes the first plurality of switches to transition between states. These transitions result in the second voltage being maintained at a value that is a multiple of the first voltage. The controller also causes the second plurality of switches to transition between states. These transitions resulting in capacitors being coupled or decoupled from the second voltage. The gate drivers derive, from the capacitors, charge for causing a voltage that enables switches from the first plurality of switches to be driven.

30 Claims, 10 Drawing Sheets

Related U.S. Application Data continuation of application No. 18/063,703, filed on Dec. 9, 2022, now Pat. No. 11,837,954, which is a continuation of application No. 17/451,666, filed on Oct. 21, 2021, now Pat. No. 11,552,560, which is a continuation of application No. 16/840,188, filed on Apr. 3, 2020, now Pat. No. 11,264,895, which is a continuation of application No. 16/385,320, filed on Apr. 16, 2019, now Pat. No. 10,644,590, which is a continuation of application No. 15/813,505, filed on Nov. 15, 2017, now Pat. No. 10,263,512, which is a continuation of application No. 15/272,935, filed on Sep. 22, 2016, now Pat. No. 9,847,715, which is a continuation of application No. 14/276,426, filed on May 13, 2014, now Pat. No. 9,502,968, which is a continuation of application No. 13/837,796, filed on Mar. 15, 2013, now Pat. No. 8,724,353.

(56) References Cited

U.S. PATENT DOCUMENTS

| | | |
|---|---|---|
| 3,818,306 A | 6/1974 | Marini |
| 3,818,360 A | 6/1974 | Boutmy et al. |
| 4,214,174 A | 7/1980 | Dickson |
| 4,408,268 A | 10/1983 | Peters et al. |
| 4,415,959 A | 11/1983 | Vinciarelli |
| 4,513,364 A | 4/1985 | Nilssen |
| 4,604,584 A | 8/1986 | Kelley |
| 4,713,742 A | 12/1987 | Parsley |
| 4,812,961 A | 3/1989 | Essaff |
| 4,903,181 A | 2/1990 | Seidel |
| 5,006,782 A | 4/1991 | Pelly |
| 5,057,986 A | 10/1991 | Henze, Jr. et al. |
| 5,119,283 A | 6/1992 | Steigerwald et al. |
| 5,132,606 A | 7/1992 | Herbert |
| 5,132,895 A | 7/1992 | Kase |
| 5,159,539 A | 10/1992 | Koyama |
| 5,198,970 A | 3/1993 | Kawabata et al. |
| 5,268,832 A | 12/1993 | Kandatsu |
| 5,301,097 A | 4/1994 | McDaniel |
| 5,331,303 A | 7/1994 | Shiota |
| 5,345,376 A | 9/1994 | Nourbakhsh |
| 5,402,329 A | 3/1995 | Wittenbreder, Jr. |
| 5,548,206 A | 8/1996 | Soo |
| 5,557,193 A | 9/1996 | Kajimoto |
| 5,563,779 A | 10/1996 | Cave et al. |
| 5,581,454 A | 12/1996 | Collins |
| 5,602,794 A | 2/1997 | Javanifard et al. |
| 5,610,807 A | 3/1997 | Kanda et al. |
| 5,661,348 A | 8/1997 | Brown |
| 5,717,581 A | 2/1998 | Canclini |
| 5,737,201 A | 4/1998 | Meynard |
| 5,761,058 A | 6/1998 | Kanda |
| 5,793,626 A | 8/1998 | Jiang |
| 5,801,987 A | 9/1998 | Dinh |
| 5,812,017 A | 9/1998 | Golla et al. |
| 5,831,846 A | 11/1998 | Jiang |
| 5,892,395 A | 4/1999 | Stengel et al. |
| 5,907,484 A | 5/1999 | Kowshik |
| 5,956,243 A | 9/1999 | Mao |
| 5,959,565 A | 9/1999 | Taniuchi et al. |
| 5,959,585 A | 9/1999 | Miltz |
| 5,978,283 A | 11/1999 | Hsu |
| 5,982,645 A | 11/1999 | Levran et al. |
| 5,991,169 A | 11/1999 | Kooken |
| 6,021,056 A | 2/2000 | Forbes et al. |
| 6,055,168 A | 4/2000 | Kotowski et al. |
| 6,084,789 A | 7/2000 | Van Lieshout |
| 6,107,864 A | 8/2000 | Fukushima |
| 6,133,788 A | 10/2000 | Dent |
| 6,140,807 A | 10/2000 | Vannatta et al. |
| 6,154,380 A | 11/2000 | Assow et al. |
| 6,157,253 A | 12/2000 | Sigmon et al. |
| 6,169,457 B1 | 1/2001 | Ichimaru |
| 6,169,673 B1 | 1/2001 | McIntyre et al. |
| 6,178,102 B1 | 1/2001 | Stanley |
| 6,198,645 B1 | 3/2001 | Kotowski et al. |
| 6,255,896 B1 | 7/2001 | Li et al. |
| 6,255,906 B1 | 7/2001 | Eidson et al. |
| 6,275,018 B1 | 8/2001 | Telefus et al. |
| 6,316,956 B1 | 11/2001 | Oglesbee |
| 6,327,462 B1 | 12/2001 | Loke et al. |
| 6,329,796 B1 | 12/2001 | Popescu |
| 6,339,538 B1 | 1/2002 | Handleman |
| 6,362,608 B1 | 3/2002 | Ashburn et al. |
| 6,362,986 B1 | 3/2002 | Schultz et al. |
| 6,377,117 B2 | 4/2002 | Oskowsky et al. |
| 6,396,341 B1 | 5/2002 | Pehlke |
| 6,400,579 B2 | 6/2002 | Cuk |
| 6,411,531 B1 | 6/2002 | Nork et al. |
| 6,429,632 B1 | 8/2002 | Forbes et al. |
| 6,456,153 B2 | 9/2002 | Buck et al. |
| 6,476,666 B1 | 11/2002 | Palusa |
| 6,486,728 B2 | 11/2002 | Kleveland |
| 6,501,325 B1 | 12/2002 | Meng |
| 6,504,422 B1 | 1/2003 | Rader |
| 6,507,503 B2 | 1/2003 | Norrga |
| 6,512,411 B2 | 1/2003 | Meng et al. |
| 6,515,612 B1 | 2/2003 | Abel |
| 6,563,235 B1 | 5/2003 | McIntyre et al. |
| 6,597,235 B2 | 7/2003 | Choi |
| 6,617,832 B1 | 9/2003 | Kobayashi |
| 6,650,552 B2 | 11/2003 | Takagi et al. |
| 6,657,875 B1 | 12/2003 | Zeng et al. |
| 6,657,876 B2 | 12/2003 | Satoh |
| 6,700,803 B2 | 3/2004 | Krein |
| 6,738,277 B2 | 5/2004 | Odell |
| 6,738,432 B2 | 5/2004 | Pehlke et al. |
| 6,759,766 B2 | 7/2004 | Hiratsuka |
| 6,791,298 B2 | 9/2004 | Shenai et al. |
| 6,798,177 B1 | 9/2004 | Liu et al. |
| 6,906,567 B2 | 6/2005 | Culler |
| 6,927,441 B2 | 8/2005 | Pappalardo |
| 6,934,167 B2 | 8/2005 | Jang et al. |
| 6,980,045 B1 | 12/2005 | Liu |
| 6,980,181 B2 | 12/2005 | Sudo |
| 6,995,995 B2 | 2/2006 | Zeng et al. |
| 7,009,858 B2 | 3/2006 | Umeda et al. |
| 7,071,660 B2 | 7/2006 | Xu et al. |
| 7,072,195 B2 | 7/2006 | Xu |
| 7,091,778 B2 | 8/2006 | Gan et al. |
| 7,103,114 B1 | 9/2006 | Lapierre |
| 7,135,847 B2 | 11/2006 | Taurand |
| 7,145,382 B2 | 12/2006 | Ker |
| 7,157,956 B2 | 1/2007 | Wei |
| 7,161,816 B2 | 1/2007 | Shteynberg et al. |
| 7,187,159 B2 | 3/2007 | Katoh |
| 7,190,210 B2 | 3/2007 | Azrai |
| 7,224,062 B2 | 5/2007 | Hsu |
| 7,236,542 B2 | 6/2007 | Matero |
| 7,239,194 B2 | 7/2007 | Azrai |
| 7,250,810 B1 | 7/2007 | Tsen |
| 7,259,974 B2 | 8/2007 | Donaldson et al. |
| 7,269,036 B2 | 9/2007 | Deng et al. |
| 7,330,070 B2 | 2/2008 | Vaisanen |
| 7,362,251 B2 | 4/2008 | Jensen et al. |
| 7,365,523 B2 | 4/2008 | Malherbe et al. |
| 7,375,992 B2 | 5/2008 | Mok et al. |
| 7,382,113 B2 | 6/2008 | Wai et al. |
| 7,382,634 B2 | 6/2008 | Buchmann |
| 7,397,677 B1 | 7/2008 | Collins et al. |
| 7,400,118 B1 | 7/2008 | Zhang et al. |
| 7,408,330 B1 | 8/2008 | Zhao |
| 7,436,239 B2 | 10/2008 | Masuko et al. |
| 7,443,705 B2 | 10/2008 | Ito |
| 7,511,978 B2 | 3/2009 | Chen |
| 7,521,914 B2 | 4/2009 | Dickerson et al. |
| 7,535,133 B2 | 5/2009 | Perreault et al. |
| 7,545,127 B2 | 6/2009 | Takahashi et al. |
| 7,589,605 B2 | 9/2009 | Perreault et al. |
| 7,595,682 B2 | 9/2009 | Lin |
| 7,595,683 B1 * | 9/2009 | Floyd .................. H02M 3/073 |
| | | 327/536 |

(56) References Cited

U.S. PATENT DOCUMENTS

| | | | |
|---|---|---|---|
| 7,598,683 | B1 | 10/2009 | Jalbout |
| 7,612,603 | B1 | 11/2009 | Petricek et al. |
| 7,616,467 | B2 | 11/2009 | Mallwitz |
| 7,633,778 | B2 | 12/2009 | Mok et al. |
| 7,642,797 | B2 | 1/2010 | Kojima et al. |
| 7,656,740 | B2 | 2/2010 | Yu et al. |
| 7,659,760 | B2 | 2/2010 | Doi |
| 7,679,429 | B2 | 3/2010 | Nakamura |
| 7,679,430 | B2 | 3/2010 | Fort et al. |
| 7,696,735 | B2 | 4/2010 | Oraw et al. |
| 7,705,672 | B1 | 4/2010 | Rodriguez |
| 7,705,681 | B2 | 4/2010 | Ilkov |
| 7,724,551 | B2 | 5/2010 | Yanagida |
| 7,728,651 | B2 | 6/2010 | Nakai |
| 7,746,041 | B2 | 6/2010 | Xu et al. |
| 7,768,800 | B2 | 8/2010 | Mazumder et al. |
| 7,777,459 | B2 | 8/2010 | Williams |
| 7,782,027 | B2 | 8/2010 | Williams |
| 7,786,712 | B2 | 8/2010 | Williams |
| 7,807,499 | B2 | 10/2010 | Nishizawa |
| 7,808,324 | B1 | 10/2010 | Woodford et al. |
| 7,812,579 | B2 | 10/2010 | Williams |
| 7,889,519 | B2 | 2/2011 | Perreault et al. |
| 7,907,429 | B2 | 3/2011 | Ramadass et al. |
| 7,907,430 | B2 | 3/2011 | Kularatna et al. |
| 7,928,705 | B2 | 4/2011 | Hooijschuur |
| 7,940,038 | B2 | 5/2011 | Da Silva et al. |
| 7,944,276 | B2 | 5/2011 | Nakai |
| 7,952,418 | B2 | 5/2011 | McDonald et al. |
| 7,956,572 | B2 | 6/2011 | Zane et al. |
| 7,956,673 | B2 | 6/2011 | Pan |
| 7,977,921 | B2 | 7/2011 | Bahai et al. |
| 7,977,927 | B2 | 7/2011 | Williams |
| 7,999,601 | B2 | 8/2011 | Schlueter |
| 8,000,117 | B2 | 8/2011 | Petricek |
| 8,018,216 | B2 | 9/2011 | Kakehi |
| 8,026,763 | B2 | 9/2011 | Dawson et al. |
| 8,031,003 | B2 | 10/2011 | Dishop |
| 8,035,148 | B2 | 10/2011 | Goldstein |
| 8,040,174 | B2 | 10/2011 | Likhterov |
| 8,048,766 | B2 | 11/2011 | Joly |
| 8,076,915 | B2 | 12/2011 | Nakazawa |
| 8,085,524 | B2 | 12/2011 | Roozeboom et al. |
| 8,089,788 | B2 | 1/2012 | Jain |
| 8,102,157 | B2 | 1/2012 | Abe |
| 8,106,597 | B2 | 1/2012 | Mednik et al. |
| 8,111,052 | B2 | 2/2012 | Glovinski |
| 8,111,054 | B2 | 2/2012 | Yen |
| 8,130,518 | B2 | 3/2012 | Fishman |
| 8,154,333 | B2 | 4/2012 | Ker et al. |
| 8,159,091 | B2 | 4/2012 | Yeates |
| 8,164,369 | B2 | 4/2012 | Raghunathan et al. |
| 8,164,384 | B2 | 4/2012 | Dawson et al. |
| 8,169,797 | B2 | 5/2012 | Coccia et al. |
| 8,193,604 | B2 | 6/2012 | Lin |
| 8,212,541 | B2 | 7/2012 | Perreault |
| 8,248,045 | B2 | 8/2012 | Shiu |
| 8,248,054 | B2 | 8/2012 | Tong |
| 8,274,322 | B2 | 9/2012 | Chang et al. |
| 8,276,002 | B2 | 9/2012 | Dennard et al. |
| 8,330,436 | B2 | 12/2012 | Oraw et al. |
| 8,339,102 | B2 | 12/2012 | Kushnarenko et al. |
| 8,339,184 | B2* | 12/2012 | Kok ............... H02M 3/073 363/60 |
| 8,350,549 | B2 | 1/2013 | Kitabatake |
| 8,354,828 | B2 | 1/2013 | Huang et al. |
| 8,384,467 | B1 | 2/2013 | Keeffe |
| 8,395,914 | B2 | 3/2013 | Klootwijk |
| 8,423,800 | B2 | 4/2013 | Huang et al. |
| 8,436,674 | B1 | 5/2013 | Standley et al. |
| 8,451,053 | B2 | 5/2013 | Perreault et al. |
| 8,456,874 | B2 | 6/2013 | Singer |
| 8,503,203 | B1 | 8/2013 | Szczeszynski |
| 8,515,361 | B2 | 8/2013 | Levesque et al. |
| 8,538,355 | B2 | 9/2013 | Stockert |
| 8,542,061 | B2 | 9/2013 | Levesque et al. |
| 8,542,169 | B2 | 9/2013 | Senda |
| 8,559,898 | B2 | 10/2013 | Jones et al. |
| 8,565,694 | B2 | 10/2013 | Jones et al. |
| 8,571,492 | B2 | 10/2013 | Berchtold et al. |
| 8,582,333 | B2 | 11/2013 | Oraw et al. |
| 8,619,443 | B2 | 12/2013 | Lumsden |
| 8,619,445 | B1* | 12/2013 | Low ............... H02M 3/073 363/59 |
| 8,629,666 | B2 | 1/2014 | Carroll et al. |
| 8,643,347 | B2 | 2/2014 | Perreault et al. |
| 8,659,353 | B2 | 2/2014 | Dawson et al. |
| 8,670,254 | B2 | 3/2014 | Perreault et al. |
| 8,674,545 | B2 | 3/2014 | Signorelli et al. |
| 8,693,224 | B1 | 4/2014 | Giuliano |
| 8,699,248 | B2 | 4/2014 | Perreault et al. |
| 8,699,973 | B2 | 4/2014 | Southcombe et al. |
| 8,706,063 | B2 | 4/2014 | Honjo et al. |
| 8,710,903 | B2 | 4/2014 | Oraw |
| 8,712,349 | B2 | 4/2014 | Southcombe et al. |
| 8,718,188 | B2 | 5/2014 | Balteanu et al. |
| 8,723,491 | B2 | 5/2014 | Giuliano |
| 8,724,353 | B1 | 5/2014 | Giuliano |
| 8,729,819 | B2 | 5/2014 | Zhao et al. |
| 8,731,498 | B2 | 5/2014 | Southcombe et al. |
| 8,737,093 | B1 | 5/2014 | Baker et al. |
| 8,743,553 | B2 | 6/2014 | Giuliano |
| 8,750,539 | B2 | 6/2014 | Pennock et al. |
| 8,760,219 | B2 | 6/2014 | Chao |
| 8,803,492 | B2 | 8/2014 | Liu |
| 8,811,920 | B2 | 8/2014 | Deuchars et al. |
| 8,811,921 | B2 | 8/2014 | Jones et al. |
| 8,817,501 | B1* | 8/2014 | Low ............... H02M 3/073 363/59 |
| 8,824,978 | B2 | 9/2014 | Briffa et al. |
| 8,829,993 | B2 | 9/2014 | Briffa et al. |
| 8,830,709 | B2 | 9/2014 | Perreault |
| 8,830,710 | B2 | 9/2014 | Perreault et al. |
| 8,831,544 | B2 | 9/2014 | Walker et al. |
| 8,842,399 | B2 | 9/2014 | Jones et al. |
| 8,854,019 | B1 | 10/2014 | Levesque et al. |
| 8,854,849 | B2 | 10/2014 | Kobeda et al. |
| 8,856,562 | B2 | 10/2014 | Huang et al. |
| 8,860,396 | B2 | 10/2014 | Giuliano |
| 8,867,281 | B2 | 10/2014 | Tran et al. |
| 8,874,828 | B2 | 10/2014 | Fai et al. |
| 8,891,258 | B2 | 11/2014 | Zhang et al. |
| 8,892,063 | B2 | 11/2014 | Jones et al. |
| 8,913,967 | B2 | 12/2014 | Zimlich et al. |
| 8,913,971 | B2 | 12/2014 | Arkiszewski et al. |
| 8,942,650 | B2 | 1/2015 | Southcombe et al. |
| 8,942,651 | B2 | 1/2015 | Jones |
| 8,947,157 | B2 | 2/2015 | Levesque et al. |
| 8,957,727 | B2 | 2/2015 | Dawson et al. |
| 8,958,763 | B2 | 2/2015 | Williams et al. |
| 8,981,836 | B2* | 3/2015 | Kern ............... H03L 7/0895 363/60 |
| 8,983,340 | B2 | 3/2015 | Southcombe et al. |
| 8,983,407 | B2 | 3/2015 | Southcombe et al. |
| 8,983,409 | B2 | 3/2015 | Ngo et al. |
| 8,983,410 | B2 | 3/2015 | Southcombe et al. |
| 8,989,685 | B2 | 3/2015 | Southcombe et al. |
| 9,008,597 | B2 | 4/2015 | Levesque et al. |
| 9,030,256 | B2 | 5/2015 | Jones et al. |
| 9,041,459 | B2 | 5/2015 | Szczeszynski et al. |
| 9,048,787 | B2 | 6/2015 | Jones et al. |
| 9,077,405 | B2 | 7/2015 | Jones et al. |
| 9,136,756 | B2 | 9/2015 | Liu |
| 9,143,032 | B2 | 9/2015 | Le et al. |
| 9,143,037 | B2 | 9/2015 | Giuliano |
| 9,184,701 | B2 | 11/2015 | Berchtold et al. |
| 9,203,299 | B2 | 12/2015 | Low et al. |
| 9,209,758 | B2 | 12/2015 | Briffa et al. |
| 9,209,787 | B2 | 12/2015 | Shelton et al. |
| 9,214,865 | B2 | 12/2015 | Levesque et al. |
| 9,214,900 | B2 | 12/2015 | Arkiszewski et al. |
| 9,362,825 | B2 | 6/2016 | Southcombe et al. |
| 9,362,826 | B2 | 6/2016 | Giuliano |
| 9,374,001 | B1 | 6/2016 | Subramaniam et al. |

(56) References Cited

U.S. PATENT DOCUMENTS

| | | |
|---|---|---|
| 9,413,257 B2 | 8/2016 | Wang et al. |
| 9,444,329 B2 | 9/2016 | Arno |
| 9,450,506 B2 | 9/2016 | Perreault et al. |
| 9,502,968 B2 | 11/2016 | Giuliano |
| 9,553,550 B2 | 1/2017 | Puliafico et al. |
| 9,577,590 B2 | 2/2017 | Levesque et al. |
| 9,584,024 B2 | 2/2017 | Manthe et al. |
| 9,601,998 B2 | 3/2017 | Le et al. |
| 9,621,138 B1 | 4/2017 | Zhang et al. |
| 9,634,577 B2 | 4/2017 | Perreault |
| 9,712,051 B2 | 7/2017 | Giuliano |
| 9,722,492 B2 | 8/2017 | Levesque et al. |
| 9,742,266 B2 | 8/2017 | Giuliano et al. |
| 9,755,672 B2 | 9/2017 | Perreault et al. |
| 9,819,283 B2 | 11/2017 | Mahdavikhah et al. |
| 9,847,712 B2 | 12/2017 | Low et al. |
| 9,847,715 B2 | 12/2017 | Giuliano |
| 9,882,471 B2 | 1/2018 | Giuliano |
| 9,899,919 B2 | 2/2018 | Crossley et al. |
| 9,900,204 B2 | 2/2018 | Levesque et al. |
| 10,523,039 B2 | 2/2019 | Melgar et al. |
| 10,243,457 B2 | 3/2019 | Puggelli et al. |
| 10,263,512 B2 | 4/2019 | Giuliano |
| 10,274,987 B2 | 4/2019 | Puggelli et al. |
| 10,326,358 B2 | 6/2019 | Giuliano |
| 10,355,593 B1 | 7/2019 | Puggelli et al. |
| 10,374,512 B2 | 8/2019 | Szczeszynski |
| 10,381,924 B2 | 8/2019 | Giuliano |
| 10,389,235 B2 | 8/2019 | Giuliano |
| 10,389,244 B2 | 8/2019 | Le et al. |
| 10,404,162 B2 | 9/2019 | Giuliano |
| 10,411,490 B2 | 9/2019 | Melgar et al. |
| 10,541,603 B2 | 1/2020 | Puggelli et al. |
| 10,601,311 B2 | 3/2020 | Meyvaert et al. |
| 10,644,590 B2 | 5/2020 | Giuliano |
| 10,666,134 B2 | 5/2020 | Low et al. |
| 10,673,335 B2 | 6/2020 | Le et al. |
| 10,680,515 B2 | 6/2020 | Giuliano |
| 10,686,380 B2 | 6/2020 | Giuliano |
| 10,715,035 B2 | 7/2020 | Li et al. |
| 10,720,832 B2 | 7/2020 | Meyvaert et al. |
| 10,749,434 B2 | 8/2020 | Giuliano et al. |
| 10,770,976 B2 | 9/2020 | Giuliano et al. |
| 10,833,579 B1 | 11/2020 | Puggelli et al. |
| 10,938,299 B2 | 3/2021 | Low et al. |
| 10,938,300 B2 | 3/2021 | Giuliano |
| 11,038,418 B2 | 6/2021 | Low et al. |
| 11,264,895 B2 | 3/2022 | Giuliano et al. |
| 11,342,844 B1 | 5/2022 | Meyvaert |
| 11,515,784 B2 | 11/2022 | Meyvaert |
| 2002/0008567 A1 | 1/2002 | Henry |
| 2002/0130704 A1 | 9/2002 | Myono et al. |
| 2002/0158660 A1 | 10/2002 | Jang et al. |
| 2003/0038669 A1 | 2/2003 | Zhang |
| 2003/0058665 A1 | 3/2003 | Kobayashi et al. |
| 2003/0151449 A1 | 8/2003 | Nakagawa et al. |
| 2003/0169096 A1 | 9/2003 | Hsu |
| 2003/0169896 A1 | 9/2003 | Kirk, III et al. |
| 2003/0227280 A1 | 12/2003 | Vinciarelli |
| 2004/0004851 A1 | 1/2004 | Itoh |
| 2004/0041620 A1 | 3/2004 | Angelo |
| 2004/0080964 A1 | 4/2004 | Buchmann |
| 2004/0095787 A1 | 5/2004 | Donaldson et al. |
| 2004/0170030 A1 | 9/2004 | Duerbaum et al. |
| 2004/0222775 A1 | 11/2004 | Muramatsu et al. |
| 2004/0246044 A1 | 12/2004 | Myono et al. |
| 2005/0007184 A1 | 1/2005 | Kamijo |
| 2005/0024125 A1 | 2/2005 | McNitt et al. |
| 2005/0047181 A1 | 3/2005 | Yumamoto et al. |
| 2005/0068073 A1 | 3/2005 | Shi et al. |
| 2005/0088865 A1 | 4/2005 | Lopez et al. |
| 2005/0102798 A1 | 5/2005 | Kato |
| 2005/0136873 A1 | 6/2005 | Kim et al. |
| 2005/0169021 A1 | 8/2005 | Itoh |
| 2005/0207133 A1 | 9/2005 | Pavier |
| 2005/0213267 A1 | 9/2005 | Azrai et al. |
| 2005/0219878 A1 | 10/2005 | Ito et al. |
| 2005/0254272 A1 | 11/2005 | Vinciarelli |
| 2005/0285767 A1 | 12/2005 | Wang et al. |
| 2005/0286278 A1 | 12/2005 | Perreault et al. |
| 2006/0139021 A1 | 6/2006 | Taurand |
| 2006/0186947 A1 | 8/2006 | Lin et al. |
| 2006/0213890 A1 | 9/2006 | Kooken et al. |
| 2006/0226130 A1 | 10/2006 | Kooken et al. |
| 2006/0244513 A1 | 11/2006 | Yen et al. |
| 2007/0013448 A1 | 1/2007 | Azuhata et al. |
| 2007/0018700 A1 | 1/2007 | Yen et al. |
| 2007/0024346 A1 | 2/2007 | Takahashi et al. |
| 2007/0035973 A1 | 2/2007 | Kitazaki et al. |
| 2007/0035977 A1 | 2/2007 | Odell |
| 2007/0051712 A1 | 3/2007 | Kooken et al. |
| 2007/0066224 A1 | 3/2007 | d'Hont et al. |
| 2007/0066250 A1 | 3/2007 | Takahashi et al. |
| 2007/0069818 A1 | 3/2007 | Bhatti et al. |
| 2007/0091655 A1 | 4/2007 | Oyama et al. |
| 2007/0123184 A1 | 5/2007 | Nesimoglu et al. |
| 2007/0146020 A1 | 6/2007 | Williams |
| 2007/0146052 A1 | 6/2007 | Byeon |
| 2007/0146090 A1 | 6/2007 | Carey et al. |
| 2007/0159257 A1 | 7/2007 | Lee et al. |
| 2007/0171680 A1 | 7/2007 | Perreault et al. |
| 2007/0182368 A1 | 8/2007 | Yang |
| 2007/0182390 A1 | 8/2007 | Ishii et al. |
| 2007/0210774 A1 | 9/2007 | Kimura |
| 2007/0230221 A1 | 10/2007 | Lim |
| 2007/0247222 A1 | 10/2007 | Sorrells et al. |
| 2007/0247253 A1 | 10/2007 | Carey et al. |
| 2007/0281635 A1 | 12/2007 | McCallister et al. |
| 2007/0290747 A1 | 12/2007 | Traylor et al. |
| 2007/0291718 A1 | 12/2007 | Chan et al. |
| 2007/0296383 A1 | 12/2007 | Xu et al. |
| 2008/0001660 A1 | 1/2008 | Rasmussen |
| 2008/0003960 A1 | 1/2008 | Zolfaghari |
| 2008/0003962 A1 | 1/2008 | Ngai |
| 2008/0007333 A1 | 1/2008 | Lee et al. |
| 2008/0008273 A1 | 1/2008 | Kim et al. |
| 2008/0009248 A1 | 1/2008 | Rozenblit et al. |
| 2008/0012637 A1 | 1/2008 | Aridas et al. |
| 2008/0013236 A1 | 1/2008 | Weng |
| 2008/0019459 A1 | 1/2008 | Chen et al. |
| 2008/0024198 A1 | 1/2008 | Bitonti et al. |
| 2008/0031023 A1 | 2/2008 | Kitagawa et al. |
| 2008/0051044 A1 | 2/2008 | Takehara |
| 2008/0055946 A1 | 3/2008 | Lesso et al. |
| 2008/0062724 A1 | 3/2008 | Feng et al. |
| 2008/0100272 A1 | 5/2008 | Yoshio |
| 2008/0136500 A1 | 6/2008 | Frulio et al. |
| 2008/0136559 A1 | 6/2008 | Takahashi et al. |
| 2008/0136991 A1 | 6/2008 | Senda |
| 2008/0150619 A1 | 6/2008 | Lesso et al. |
| 2008/0150621 A1 | 6/2008 | Lesso |
| 2008/0157732 A1 | 7/2008 | Williams |
| 2008/0157733 A1 | 7/2008 | Williams |
| 2008/0158915 A1 | 7/2008 | Williams |
| 2008/0186081 A1 | 8/2008 | Yamahira |
| 2008/0231233 A1 | 9/2008 | Thornton |
| 2008/0233913 A1 | 9/2008 | Sivasubramaniam |
| 2008/0239772 A1 | 10/2008 | Oraw |
| 2008/0266917 A1 | 10/2008 | Lin et al. |
| 2008/0284398 A1 | 11/2008 | Qiu et al. |
| 2009/0004981 A1 | 1/2009 | Eliezer et al. |
| 2009/0033289 A1 | 2/2009 | Xing et al. |
| 2009/0033293 A1 | 2/2009 | Xing et al. |
| 2009/0039843 A1 | 2/2009 | Kudo |
| 2009/0039947 A1 | 2/2009 | Williams |
| 2009/0059630 A1 | 3/2009 | Williams |
| 2009/0066407 A1 | 3/2009 | Bowman et al. |
| 2009/0072800 A1* | 3/2009 | Ramadass ............... H02M 3/07 323/284 |
| 2009/0102439 A1 | 4/2009 | Williams |
| 2009/0121782 A1 | 5/2009 | Oyama et al. |
| 2009/0147554 A1 | 6/2009 | Adest et al. |
| 2009/0174383 A1 | 7/2009 | Tsui et al. |
| 2009/0176464 A1 | 7/2009 | Liang et al. |

(56) References Cited

U.S. PATENT DOCUMENTS

| | | |
|---|---|---|
| 2009/0195298 A1 | 8/2009 | Nakai |
| 2009/0196082 A1 | 8/2009 | Mazumder et al. |
| 2009/0200874 A1 | 8/2009 | Takai |
| 2009/0206804 A1 | 8/2009 | Xu et al. |
| 2009/0225012 A1 | 9/2009 | Choi |
| 2009/0230934 A1 | 9/2009 | Hooijschuur et al. |
| 2009/0257211 A1 | 10/2009 | Kontani |
| 2009/0273955 A1 | 11/2009 | Tseng et al. |
| 2009/0278520 A1 | 11/2009 | Perreault et al. |
| 2009/0302686 A1 | 12/2009 | Fishman |
| 2009/0303753 A1 | 12/2009 | Fu et al. |
| 2009/0309566 A1 | 12/2009 | Shiu |
| 2009/0311980 A1 | 12/2009 | Sjoland |
| 2009/0322304 A1 | 12/2009 | Oraw et al. |
| 2009/0322384 A1 | 12/2009 | Oraw et al. |
| 2009/0322414 A1 | 12/2009 | Oraw et al. |
| 2009/0323380 A1 | 12/2009 | Harrison |
| 2010/0013548 A1 | 1/2010 | Barrow |
| 2010/0027596 A1 | 2/2010 | Bellaouar et al. |
| 2010/0039085 A1 | 2/2010 | Petricek |
| 2010/0060326 A1 | 3/2010 | Palmer et al. |
| 2010/0073084 A1 | 3/2010 | Hur et al. |
| 2010/0080023 A1 | 4/2010 | Jain |
| 2010/0085786 A1 | 4/2010 | Chiu et al. |
| 2010/0097104 A1 | 4/2010 | Yang et al. |
| 2010/0110741 A1 | 5/2010 | Lin |
| 2010/0117612 A1 | 5/2010 | Klootwijk et al. |
| 2010/0117700 A1 | 5/2010 | Raghunathan et al. |
| 2010/0117719 A1 | 5/2010 | Matano |
| 2010/0118458 A1 | 5/2010 | Coffey |
| 2010/0120475 A1 | 5/2010 | Taniuchi et al. |
| 2010/0123447 A1 | 5/2010 | Vecera et al. |
| 2010/0140736 A1 | 6/2010 | Lin |
| 2010/0142239 A1 | 6/2010 | Hopper |
| 2010/0156369 A1 | 6/2010 | Kularatna et al. |
| 2010/0156370 A1 | 6/2010 | Tseng et al. |
| 2010/0164579 A1 | 7/2010 | Acatrinei |
| 2010/0176869 A1 | 7/2010 | Horie et al. |
| 2010/0201441 A1 | 8/2010 | Gustavsson |
| 2010/0202161 A1 | 8/2010 | Sims |
| 2010/0205614 A1 | 8/2010 | Suslov |
| 2010/0214014 A1 | 8/2010 | Dennard et al. |
| 2010/0214746 A1 | 8/2010 | Lotfi |
| 2010/0237833 A1 | 9/2010 | Abe |
| 2010/0244189 A1 | 9/2010 | Klootwijk |
| 2010/0244585 A1 | 9/2010 | Tan |
| 2010/0244935 A1 | 9/2010 | Kim et al. |
| 2010/0291888 A1 | 11/2010 | Hadjichristos et al. |
| 2010/0308751 A1 | 12/2010 | Nerone |
| 2010/0321041 A1 | 12/2010 | Feldtkeller |
| 2011/0001542 A1 | 1/2011 | Ranta et al. |
| 2011/0018511 A1 | 1/2011 | Carpenter et al. |
| 2011/0026275 A1 | 2/2011 | Huang et al. |
| 2011/0050325 A1 | 3/2011 | Schatzberger et al. |
| 2011/0051476 A1 | 3/2011 | Manor et al. |
| 2011/0062940 A1 | 3/2011 | Shvartsman |
| 2011/0089483 A1 | 4/2011 | Reynes et al. |
| 2011/0101884 A1 | 5/2011 | Kim et al. |
| 2011/0101938 A1 | 5/2011 | Ma |
| 2011/0115550 A1 | 5/2011 | Pelley |
| 2011/0128761 A1 | 6/2011 | Ripley et al. |
| 2011/0148385 A1 | 6/2011 | North et al. |
| 2011/0148518 A1 | 6/2011 | Lejon et al. |
| 2011/0154068 A1 | 6/2011 | Huang et al. |
| 2011/0156819 A1 | 6/2011 | Kim et al. |
| 2011/0163414 A1 | 7/2011 | Lin |
| 2011/0175591 A1 | 7/2011 | Cuk |
| 2011/0176335 A1 | 7/2011 | Li et al. |
| 2011/0181115 A1 | 7/2011 | Ivanov |
| 2011/0181128 A1 | 7/2011 | Perreault et al. |
| 2011/0204858 A1 | 8/2011 | Kudo |
| 2011/0204959 A1 | 8/2011 | Sousa et al. |
| 2011/0204962 A1 | 8/2011 | Gorisse et al. |
| 2011/0236766 A1 | 9/2011 | Kolosnitsyn et al. |
| 2011/0241767 A1 | 10/2011 | Curatola et al. |
| 2011/0273151 A1 | 11/2011 | Lesso et al. |
| 2011/0304310 A1 | 12/2011 | Sotono |
| 2012/0014153 A1 | 1/2012 | Christoph et al. |
| 2012/0043818 A1 | 2/2012 | Stratakos et al. |
| 2012/0050137 A1 | 3/2012 | Hellenthal et al. |
| 2012/0064953 A1 | 3/2012 | Dagher et al. |
| 2012/0075891 A1 | 3/2012 | Zhang et al. |
| 2012/0105137 A1 | 5/2012 | Kok |
| 2012/0119718 A1 | 5/2012 | Song |
| 2012/0126909 A1 | 5/2012 | McCune, Jr. |
| 2012/0139515 A1 | 6/2012 | Li |
| 2012/0146177 A1 | 6/2012 | Choi |
| 2012/0146451 A1 | 6/2012 | Nitta |
| 2012/0153907 A1 | 6/2012 | Carobolante et al. |
| 2012/0153912 A1 | 6/2012 | Demski et al. |
| 2012/0154023 A1 | 6/2012 | Pan et al. |
| 2012/0158188 A1 | 6/2012 | Madala |
| 2012/0170334 A1 | 7/2012 | Menegoli et al. |
| 2012/0176195 A1 | 7/2012 | Dawson et al. |
| 2012/0200340 A1 | 8/2012 | Shook et al. |
| 2012/0212201 A1 | 8/2012 | Lee et al. |
| 2012/0212293 A1 | 8/2012 | Khlat |
| 2012/0223773 A1 | 9/2012 | Jones et al. |
| 2012/0243267 A1 | 9/2012 | Kassayan |
| 2012/0249096 A1 | 10/2012 | Enenkel |
| 2012/0249224 A1 | 10/2012 | Wei et al. |
| 2012/0250360 A1 | 10/2012 | Orr et al. |
| 2012/0252382 A1 | 10/2012 | Bashir et al. |
| 2012/0268030 A1 | 10/2012 | Riesebosch |
| 2012/0293254 A1 | 11/2012 | Liu et al. |
| 2012/0313602 A1 | 12/2012 | Perreault |
| 2012/0326684 A1 | 12/2012 | Perreault |
| 2013/0005286 A1 | 1/2013 | Chan et al. |
| 2013/0043931 A1 | 2/2013 | Khlat et al. |
| 2013/0044519 A1 | 2/2013 | Teraura et al. |
| 2013/0049714 A1 | 2/2013 | Chiu |
| 2013/0049885 A1 | 2/2013 | Rozman et al. |
| 2013/0058049 A1 | 3/2013 | Roth et al. |
| 2013/0058141 A1 | 3/2013 | Oraw et al. |
| 2013/0063120 A1 | 3/2013 | Hoellinger et al. |
| 2013/0069614 A1 | 3/2013 | Tso et al. |
| 2013/0094157 A1 | 4/2013 | Giuliano |
| 2013/0106375 A1 | 5/2013 | Marsili et al. |
| 2013/0106380 A1 | 5/2013 | Marsili et al. |
| 2013/0106381 A1 | 5/2013 | Marsili |
| 2013/0106382 A1 | 5/2013 | Marsili et al. |
| 2013/0154491 A1 | 6/2013 | Hawley |
| 2013/0154600 A1 | 6/2013 | Giuliano |
| 2013/0163302 A1 | 6/2013 | Li et al. |
| 2013/0163392 A1 | 6/2013 | Braunberger |
| 2013/0181521 A1 | 7/2013 | Khlat |
| 2013/0187612 A1 | 7/2013 | Aiura |
| 2013/0201729 A1 | 8/2013 | Ahsanuzzaman et al. |
| 2013/0229841 A1 | 9/2013 | Giuliano |
| 2013/0234785 A1 | 9/2013 | Dai et al. |
| 2013/0241625 A1 | 9/2013 | Perreault et al. |
| 2013/0245487 A1 | 9/2013 | Aga |
| 2013/0279224 A1 | 10/2013 | Ofek |
| 2013/0287231 A1 | 10/2013 | Kropfitsch |
| 2013/0293310 A1 | 11/2013 | Levesque et al. |
| 2013/0300385 A1 | 11/2013 | Li et al. |
| 2013/0313904 A1 | 11/2013 | Kayama |
| 2013/0322126 A1 | 12/2013 | Pan et al. |
| 2013/0343106 A1 | 12/2013 | Perreault et al. |
| 2013/0343107 A1 | 12/2013 | Perreault |
| 2014/0015731 A1 | 1/2014 | Khlat et al. |
| 2014/0022005 A1 | 1/2014 | Ramanan et al. |
| 2014/0070787 A1 | 3/2014 | Arno |
| 2014/0091773 A1 | 4/2014 | Burlingame |
| 2014/0092643 A1 | 4/2014 | Luccato |
| 2014/0118065 A1 | 5/2014 | Briffa et al. |
| 2014/0118072 A1 | 5/2014 | Briffa et al. |
| 2014/0120854 A1 | 5/2014 | Briffa et al. |
| 2014/0167513 A1 | 6/2014 | Chang et al. |
| 2014/0167722 A1 | 6/2014 | Lee |
| 2014/0167853 A1 | 6/2014 | Haruna et al. |
| 2014/0177300 A1 | 6/2014 | Lagorce et al. |
| 2014/0184177 A1 | 7/2014 | Tournatory et al. |
| 2014/0266132 A1 | 9/2014 | Low et al. |

(56) References Cited

U.S. PATENT DOCUMENTS

| | | |
|---|---|---|
| 2014/0268945 A1 | 9/2014 | Low et al. |
| 2014/0313781 A1 | 10/2014 | Perreault et al. |
| 2014/0327479 A1 | 11/2014 | Giuliano |
| 2014/0339918 A1 | 11/2014 | Perreault et al. |
| 2014/0355322 A1 | 12/2014 | Perreault et al. |
| 2015/0002195 A1 | 1/2015 | Englekirk |
| 2015/0023063 A1 | 1/2015 | Perreault et al. |
| 2015/0077175 A1 | 3/2015 | Giuliano et al. |
| 2015/0077176 A1 | 3/2015 | Szczeszynski et al. |
| 2015/0084701 A1 | 3/2015 | Perreault et al. |
| 2015/0255547 A1 | 9/2015 | Yuan et al. |
| 2015/0295497 A1 | 10/2015 | Perreault et al. |
| 2015/0318851 A1 | 11/2015 | Roberts et al. |
| 2016/0028302 A1 | 1/2016 | Low et al. |
| 2017/0170725 A1 | 6/2017 | Giuliano |
| 2018/0159427 A1 | 6/2018 | Giuliano |
| 2019/0036450 A1 | 1/2019 | Szczeszynski |
| 2019/0245436 A1 | 8/2019 | Giuliano |

FOREIGN PATENT DOCUMENTS

| | | | |
|---|---|---|---|
| CN | 1132959 A | | 10/1996 |
| CN | 1057410 C | | 10/2000 |
| CN | 1452306 A | | 10/2003 |
| CN | 1483204 A | | 3/2004 |
| CN | 1728518 A | | 2/2006 |
| CN | 1761136 A | | 4/2006 |
| CN | 1825485 A | | 8/2006 |
| CN | 1988349 A | | 6/2007 |
| CN | 101009433 A | | 8/2007 |
| CN | 101034536 A | | 9/2007 |
| CN | 101071981 A | | 11/2007 |
| CN | 101079576 A | | 11/2007 |
| CN | 101174789 A | | 5/2008 |
| CN | 101286696 | | 10/2008 |
| CN | 101286696 A | | 10/2008 |
| CN | 101297465 A | | 10/2008 |
| CN | 101399496 A | | 4/2009 |
| CN | 101447753 A | | 6/2009 |
| CN | 101563845 A | | 10/2009 |
| CN | 101588135 A | | 11/2009 |
| CN | 101611531 A | | 12/2009 |
| CN | 101636702 A | | 1/2010 |
| CN | 101647181 A | | 2/2010 |
| CN | 101647182 A | | 2/2010 |
| CN | 101662208 A | | 3/2010 |
| CN | 101707437 A | | 5/2010 |
| CN | 101765963 A | | 6/2010 |
| CN | 101931204 A | | 12/2010 |
| CN | 101976953 A | | 2/2011 |
| CN | 101997406 | | 3/2011 |
| CN | 101997406 A | | 3/2011 |
| CN | 102055328 A | | 5/2011 |
| CN | 102118130 | | 7/2011 |
| CN | 102118130 A | | 7/2011 |
| CN | 102171918 A | | 8/2011 |
| CN | 102185484 A | | 9/2011 |
| CN | 102210102 A | | 10/2011 |
| CN | 102480291 A | | 5/2012 |
| CN | 102769986 A | | 11/2012 |
| CN | 102904436 A | | 1/2013 |
| CN | 103178711 A | | 6/2013 |
| CN | 103275753 A | | 9/2013 |
| CN | 103636288 A | | 3/2014 |
| CN | 103650313 A | | 3/2014 |
| CN | 103650313 B | | 3/2014 |
| CN | 103650314 A | | 3/2014 |
| CN | 103975433 A | | 8/2014 |
| CN | 104011985 | | 8/2014 |
| CN | 104011985 A | | 8/2014 |
| CN | 105229908 | | 1/2016 |
| CN | 105229908 A | | 1/2016 |
| CN | 105393445 | | 3/2016 |
| CN | 105393445 B | | 3/2016 |
| CN | 201480028501 B | | 3/2016 |
| CN | 108964442 A | | 12/2018 |
| CN | 110277908 | | 9/2019 |
| CN | 110581646 | | 12/2019 |
| CN | 110581646 B | | 12/2019 |
| CN | 115580109 | | 1/2023 |
| DE | 2705597 A1 | | 8/1977 |
| DE | 3347106 A1 | | 7/1985 |
| DE | 10358299 A1 | | 7/2005 |
| DE | 112012005353 | | 10/2014 |
| DE | 112014001 448 | | 1/2016 |
| DE | 112014001448 T5 | | 1/2016 |
| DE | 112013006828 T5 | | 3/2016 |
| EP | 0513920 A2 | | 11/1992 |
| EP | 0773622 A2 | | 5/1997 |
| EP | 1199788 A1 | | 4/2002 |
| EP | 1635444 B1 | | 3/2006 |
| EP | 1750366 A2 | | 2/2007 |
| EP | 2469694 A1 | | 6/2012 |
| EP | 2705597 A2 | | 3/2014 |
| EP | 2705597 B1 | | 8/2018 |
| EP | 3425784 A1 | | 1/2019 |
| FR | 2852748 A1 | | 9/2004 |
| GB | 2232830 A | | 12/1990 |
| GB | 2505371 A | | 2/2014 |
| GB | 2512259 | | 9/2014 |
| GB | 2526492 | | 11/2015 |
| GB | 2526492 A | | 11/2015 |
| GB | 2527447 | | 12/2015 |
| GB | 2527447 A | | 12/2015 |
| GB | 2587296 | | 3/2021 |
| GB | 2587732 | | 4/2021 |
| GB | 2588878 | | 5/2021 |
| GB | 2589040 | | 5/2021 |
| JP | H05191970 A | | 7/1993 |
| JP | H0787682 A | | 3/1995 |
| JP | 09135567 A | | 5/1997 |
| JP | 10327573 A | | 12/1998 |
| JP | 10327575 A | | 12/1998 |
| JP | H10327573 | | 12/1998 |
| JP | H10327573 A | | 12/1998 |
| JP | H10327575 A | | 12/1998 |
| JP | H 11113249 A | | 4/1999 |
| JP | 11235053 A | | 8/1999 |
| JP | H11235053 | | 8/1999 |
| JP | H11235053 A | | 8/1999 |
| JP | 2000060110 A | | 2/2000 |
| JP | 2000134095 A | | 5/2000 |
| JP | 2002062858 A | | 2/2002 |
| JP | 2002506609 A | | 2/2002 |
| JP | 2002233139 A | | 8/2002 |
| JP | 2002305248 A | | 10/2002 |
| JP | 2003284324 | | 10/2003 |
| JP | 2003284324 A | | 10/2003 |
| JP | 3475688 B2 | | 12/2003 |
| JP | 2004187355 A | | 7/2004 |
| JP | 2006025592 A | | 1/2006 |
| JP | 2006050833 A | | 2/2006 |
| JP | 2006067783 A | | 3/2006 |
| JP | 2007215320 A | | 8/2007 |
| JP | 2007336753 A | | 12/2007 |
| JP | 2008118517 A | | 5/2008 |
| JP | 2008220001 A | | 9/2008 |
| JP | 2009022093 A | | 1/2009 |
| JP | 2009513098 A | | 3/2009 |
| JP | 2009124826 A | | 6/2009 |
| JP | 2009165227 A | | 7/2009 |
| JP | 2010045943 | | 2/2010 |
| JP | 2010045943 A | | 2/2010 |
| JP | 2010521943 A | | 6/2010 |
| JP | 2011072094 A | | 4/2011 |
| JP | 2011253217 A | | 12/2011 |
| JP | 2012157211 A | | 8/2012 |
| JP | 2013034298 A | | 2/2013 |
| JP | 2013065939 A | | 4/2013 |
| JP | 5297116 B2 | | 9/2013 |
| JP | 2014212654 A | | 11/2014 |
| KR | 1019990002891 A | | 1/1999 |
| KR | 20000052068 A | | 8/2000 |
| KR | 1020100023304 A | | 3/2010 |

(56) References Cited

FOREIGN PATENT DOCUMENTS

| KR | 20100138146 | | 12/2010 |
|---|---|---|---|
| KR | 20100138146 | A | 12/2010 |
| KR | 1020100138146 | A | 12/2010 |
| KR | 1020110053681 | A | 5/2011 |
| KR | 1020110061121 | A | 6/2011 |
| KR | 1020120010636 | A | 2/2012 |
| KR | 1020130066266 | A | 6/2013 |
| KR | 1020140015528 | A | 2/2014 |
| KR | 1020140033577 | A | 3/2014 |
| KR | 1020140103351 | | 8/2014 |
| KR | 1020150085072 | A | 7/2015 |
| KR | 101556838 | B1 | 10/2015 |
| KR | 20150131338 | | 11/2015 |
| KR | 1020150132530 | | 11/2015 |
| KR | 1020200077607 | | 6/2020 |
| KR | 20220098263 | | 7/2022 |
| TW | 200701608 | A | 1/2007 |
| TW | 201444252 | | 11/2014 |
| WO | WO2004047303 | A1 | 6/2004 |
| WO | WO2004047303 | A8 | 6/2004 |
| WO | WO2006093600 | | 9/2006 |
| WO | WO2006093600 | A2 | 9/2006 |
| WO | WO2007136919 | A2 | 11/2007 |
| WO | WO2009012900 | A1 | 1/2009 |
| WO | WO2009112900 | | 9/2009 |
| WO | WO2009112900 | A1 | 9/2009 |
| WO | WO2009/155540 | A1 | 12/2009 |
| WO | WO2010056912 | A1 | 5/2010 |
| WO | WO2011089483 | | 7/2011 |
| WO | WO2011089483 | A1 | 7/2011 |
| WO | WO2012085598 | A2 | 6/2012 |
| WO | WO2012151466 | | 11/2012 |
| WO | WO2012151466 | A2 | 11/2012 |
| WO | WO2012/171938 | A2 | 12/2012 |
| WO | WO2012151466 | A3 | 2/2013 |
| WO | WO2013059446 | | 4/2013 |
| WO | WO2013059446 | A1 | 4/2013 |
| WO | WO2013/085537 | A1 | 6/2013 |
| WO | WO2013086445 | A1 | 6/2013 |
| WO | WO2013096416 | | 6/2013 |
| WO | WO2013096416 | A1 | 6/2013 |
| WO | WO2014070998 | A1 | 5/2014 |
| WO | 2014150354 | A1 | 9/2014 |
| WO | WO2014143366 | | 9/2014 |
| WO | WO2014143366 | A1 | 9/2014 |
| WO | WO2014150354 | | 9/2014 |

OTHER PUBLICATIONS

U.S. Appl. No. 14/276,426, filed May 13, 2014, 42 pages, Doc 8079.
U.S. Appl. No. 15/813,505, filed Nov. 15, 2017, 39 pages, Doc 8080.
CN201480028501—CN Patent Application dated Nov. 16, 2015, 23 pages, Doc 8081.
CN201480028501—Patent Certificate dated Sep. 10, 2019, 4 pages, Doc 8077.
CN201910745987—CN Patent Application filed Aug. 13, 2019, 49 pages, Doc 8074.
CN201910745987—First Office Action dated Dec. 2, 2020, 5 pages, Doc 8075.
CN201910745987—Response to First Office Action dated Apr. 19, 2021, 16, pages, Doc 8076.
GB1516828—GB Patent Application filed Sep. 23, 2015, 23 pages, Doc 8082.
GB1516828—Warning of Refusal Under Section 20(1) dated Feb. 20, 2021, 5 pages, Doc 8083.
GB2019790—GB Patent Application dated Dec. 15, 2020, 34 pages, Doc 8084.
GB2019790—Examination Report dated Jan. 7, 2021, 3 pages, Doc 8085.
GB2019790—Response to Examination Report filed Apr. 7, 2021, 7 pages, Doc 8086.
GB2105376—GB Patent Application filed Apr. 15, 2021, 35 pages, Doc 8087.
GB2105376—Examination Report Under Section 18(3) dated Apr. 27, 2021, 2 pages, Doc 8089.
GB2105376—Response to Examination Report Under Section 18(3) filed Jun. 8, 2021, 4 pages, Doc 8090.
GB2105376—Examiner Letter dated Jun. 21, 2021, Doc 8088.
DE112014001448—DE Patent Application filed Sep. 15, 2015, 36 pages, Doc 8091.
DE112014001448—Request for Examination and Preliminary Amendment filed Mar. 22, 2021, 8 pages, Doc 8092.
KR20157029810—KR Patent Application filed Oct. 15, 2015, pages, Doc 8093.
TW103109646—TW Patent Application filed Mar. 14, 2014, 33 pages, Doc 8096.
U.S. Appl. No. 16/146,086, filed Sep. 28, 2018, 73 pages, Doc 8097.
Notice of Allowance mailed Oct. 19, 2017, U.S. Appl. No. 15/272,935, 17 pgs.
Issue Fee Payment filed Nov. 14, 2017, U.S. Appl. No. 15/272,935, 6 pgs.
Issue Notification mailed Nov. 29, 2017, U.S. Appl. No. 15/272,935, 1 pg.
Filing Receipt and Notice to File Missing Parts mailed Dec. 4, 2017, U.S. Appl. No. 15/813,505, 6 pgs.
Response to Notice to File Missing Parts filed Feb. 5, 2018, U.S. Appl. No. 15/813,505, 6 pgs.
Request for Corrected Filing Receipt filed Feb. 23, 2018, U.S. Appl. No. 15/813,505, 6 pgs. 12 pgs.
Updated Filing Receipt and Notice of Acceptance of Power of Attorney mailed Feb. 28, 2018, U.S. Appl. No. 15/813,505, 5 pgs.
Non-Final Office Action mailed Apr. 5, 2018, U.S. Appl. No. 15/813,505, 15 pgs.
Notice of Publication mailed Jun. 6, 2018, U.S. Appl. No. 15/813,505, 1 pg.
Response to Non-Final Office Action filed Jun. 25, 2018, U.S. Appl. No. 15/813,505, 9 pgs.
Request for Corrected Filing Receipt filed Oct. 19, 2018, U.S. Appl. No. 15/813,505, 13 pgs.
Notice of Allowance mailed Oct. 29, 2018, U.S. Appl. No. 15/813,505, 18 pgs.
Corrected Filing Receipt mailed Nov. 29, 2018, U.S. Appl. No. 15/813,505, 3 pgs.
Supplemental Notice of Allowability mailed Jan. 24, 2019, U.S. Appl. No. 15/813,505, 5 pgs.
Issue Fee Payment and Rule 312 Amendment filed Jan. 29, 2019, U.S. Appl. No. 15/813,505, 13 pgs.
Supplemental Notice of Allowability and Response to Rule 312 Amendment mailed Mar. 8, 2019, U.S. Appl. No. 15/813,505, 7 pgs.
Issue Notification mailed Mar. 27, 2019, U.S. Appl. No. 15/813,505, 1 pg.
Filing Receipt mailed Apr. 30, 2019, U.S. Appl. No. 16/385,320, 5 pgs.
Notice of Publication mailed Aug. 8, 2019, U.S. Appl. No. 16/385,320, 1 pg.
Notice of Allowance mailed Jan. 2, 2020, U.S. Appl. No. 16/385,320, 24 pgs.
Power of Attorney filed Mar. 19, 2020, U.S. Appl. No. 16/385,320, 6 pgs.
Notice of Acceptance of Power of Attorney mailed Mar. 24, 2020, U.S. Appl. No. 16/385,320, 1 pg.
Issue Fee Payment and Rule 312 Amendment filed Apr. 2, 2020, U.S. Appl. No. 16/385,320, 8 pgs.
Issue Notification mailed Apr. 15, 2020, U.S. Appl. No. 16/385,320, 1 pg.
International Search Report mailed Jul. 17, 2014, International Patent Application No. PCT/US2014/023025, 3 pgs.
Written Opinion of the International Searching Authority mailed Jul. 17, 2014, International Patent Application No. PCT/US2014/023025, 5 pgs.
International Preliminary Report on Patentability mailed Sep. 15, 2015, International Patent Application No. PCT/US2014/023025, 6 pgs.

(56) References Cited

OTHER PUBLICATIONS

First Office Action issued on Jun. 2, 2017, Chinese Patent Application No. 201480028501.9, 7 pgs.
Claims as Amended and response as filed to the First Office Action Nov. 17, 2017, Chinese Patent Application No. 201480028501.9, 31 pgs.
Second Office Action issued Mar. 15, 2018, Chinese Patent Application No. 201480028501.9, 8 pgs.
Claims as Amended and response as filed to the Second Office Action May 30, 2018, Chinese Patent Application No. 201480028501.9, 37 pgs.
Third Office Action issued Sep. 20, 2018, Chinese Patent Application No. 201480028501.9, 8 pgs.
Claims as Amended and response as filed to the Third Office Action Dec. 3, 2018, Chinese Patent Application No. 201480028501.9, 37 pgs.
Claims as Amended and filed in response to the Examiner's Telephonic Message May 9, 2019, Chinese Patent Application No. 201480028501.9, 14 pgs.
Notification of Grant issued May 29, 2019, Chinese Patent Application No. 201480028501.9, 4 pgs.
Examination Report under Section 18(3) issued Mar. 16, 2020, Great Britan PatentApplication No. GB1516828.9, 5 pgs.
Examiner Initialed 1449s/SB08s for U.S. Appl. No. 13/837,796 considered Dec. 11, 2013 (30096-007001), 5 pgs.
Examiner Initialed 1449s/SB08 for U.S. Appl. No. 14/276,426 considered Apr. 17, 2015 (30096-007002), 8 pgs.
Examiner Initialed 1449s/SB08 for U.S. Appl. No. 15/272,935 considered May 30, 2017 (30096-007003), 6 pgs.
Examiner Initialed 1449s/SB08 for U.S. Appl. No. 15/813,505 considered Mar. 31, 2018 (30096-007004), 6 pgs.
Examiner Initialed 1449s/SB08 for U.S. Appl. No. 16/385,320 considered Dec. 22, 2019 (30096-007005), 6 pgs.
Filing Recept issued Oct. 23, 2018, U.S. Appl. No. 16/146,086, 3 pgs.
Notice of Publication issued Jan. 31, 2019, U.S. Appl. No. 16/146,086, 1 pg.
Notice of Allowance issued Mar. 28, 2019, U.S. Appl. No. 16/146,086, 8 pgs.
Informational Notice to Applicant issued Oct. 23, 2018, U.S. Appl. No. 16/146,086, 1 pg.
Response to Informational Notice to Applicant filed Apr. 26, 2019, U.S. Appl. No. 16/146,086, 11 pgs.
Notice of Acceptance of Power of Attorney, issued May 1, 2019, U.S. Appl. No. 16/146,086, 1 pg.
Notice Requiring Inventor's Oath or Dedaration issued May 6, 2019, U.S. Appl. No. 16/146,086, 1 pg.
Resubmission of Substitute Declaration filed May 23, 2019, U.S. Appl. No. 16/146,086, 4 pgs.
Issue Fee Payment filed Jun. 24, 2019, U.S. Appl. No. 16/146,086, 6 pgs.
Issue Notification mailed Jul. 17, 2019, U.S. Appl. No. 16/146,086, 1 pg.
Filing Receipt mailed May 2, 2013, U.S. Appl. No. 13/837,796, 3 pgs.
Decision Granting Request for Prioritized Examination mailed May 6, 2013, U.S. Appl. No. 13/837,736, 1 pg.
Non-Final Office Action mailed Sep. 9, 2013, U.S. Appl. No. 13/837,736, 8 pgs.
Response to Non Final Office Action mailed Dec. 9, 2013, U.S. Appl. No. 13/837,736, 15 pgs.
Notice of Allowance mailed Dec. 26, 2013, U.S. Appl. No. 13/837,736, 17 pgs.
Issue Fee Payment as Filed Mar. 26, 2014, U.S. Appl. No. 13/837,736, 6 pgs.
Issue Notification mailed Apr. 23, 2014, U.S. Appl. No. 13/837,736, 1 pgs.
Notification of Loss of Entitlement to Small Entity Status Under 37 CFR. 1.27 (g)(2) mailed Jun. 5, 2017, U.S. Appl. No. 13/837,736, 1 pgs.
Acknowledgement of Loss of Entitlement to Entity Status Discount mailed Oct. 6, 2017, U.S. Appl. No. 13/837,736, 1 pgs.
Filing Receipt mailed May 28, 2014, U.S. Appl. No. 14/276,426, 3 pgs.
Notice to File Missing Parts of NonProvisional Application mailed May 28, 2014, U.S. Appl. No. 14/276,426, 2 pgs.
Response to Notice to File Missing Parts of NonProvisional Application and Preliminary Amendment filed Jul. 24, 2014, U.S. Appl. No. 14/276,426, 16 pgs.
Updated Filing Receipt and Notice of Acceptance of Power of Attorney mailed Jul. 30, 2014, U.S. Appl. No. 14/276,426, 4 pages.
Preliminary Amendment and Request for Participation in PPH Pilot Program filed Sep. 30, 2014, U.S. Appl. No. 14/276,426, 9 pgs.
Notice of Publication mailed Nov. 5, 2014, U.S. Appl. No. 14/276,426, 1 pg.
Patent Prosecution Highway decision on request/petition to make special mailed Mar. 17, 2015, U.S. Appl. No. 14/276,426, 2 pgs.
Non-Final Office Action mailed Apr. 23, 2015, U.S. Appl. No. 14/276,426, 20 pgs.
Response to Non-Final Office Action filed Jul. 23, 2015, U.S. Appl. No. 14/276,426, 19 pgs.
Final Office Action mailed Sep. 29, 2015, U.S. Appl. No. 14/276,426, 18 pgs.
Response to Final Office Action and AFCP Request filed Nov. 30, 2015, U.S. Appl. No. 14/276,426, 17 pgs.
Advisory Action and AFCP Decision mailed Jan. 14, 2016, U.S. Appl. No. 14/276,426, 6 pgs.
Notice of Appeal filed Jan. 29, 2016, U.S. Appl. No. 14/276,426, 11 pgs.
Pre-Brief Appeal Conference decision mailed Apr. 20, 2016, U.S. Appl. No. 14/276,426, 2 pgs.
Request for Continued Examination and Amendmentfiled May 20, 2016, U.S. Appl. No. 14/276,426, 20 pgs.
Notice of Allowance mailed Jun. 22, 2016, U.S. Appl. No. 14/276,426, 18 pgs.
Request for Corrected Filing Receipt filed Sep. 20, 2016, U.S. Appl. No. 14/276,426, 8 pgs.
Issue Fee Payment and Rule 312 Amendment filed Sep. 22, 2016, U.S. Appl. No. 14/276,426, 17 pgs.
Corrected Filing Receipt mailed Sep. 22, 2016, U.S. Appl. No. 14/276,426, 3 pgs.
Supplemental Notice of Allowability mailed Oct. 20, 2016, U.S. Appl. No. 14/276,426, 5 pgs.
Issue Notification mailed Nov. 2, 2016, U.S. Appl. No. 14/276,426, 1 pg.
Acknowledgement of Loss of Entitlement to Entity Status Discount issued Oct. 6, 2017, U.S. Appl. No. 14/276,426, 1 pg.
Filing Receipt and Notice to File Missing Parts mailed Oct. 5, 2016, U.S. Appl. No. 15/272,935, 6 pgs.
Preliminary Amendment and Response to Notice to File Missing Parts filed Mar. 6, 2017, U.S. Appl. No. 15/272,935, 66 pgs.
Notice of Publication mailed Jun. 15, 2017, U.S. Appl. No. 15/272,935, 1 pg.
Non-Final Office Action mailed Jul. 3, 2017, U.S. Appl. No. 15/272,935, 22 pgs.
Response to Non-Final Office Action and Terminal Disclaimer filed Oct. 2, 2017, U.S. Appl. No. 15/272,935 16 pgs.
Notification of loss of entitlement to small entity status, U.S. Appl. No. 15/272,935, 1 pg.
Request for Corrected Filing Receipt filed Oct. 4, 2017, U.S. Appl. No. 15/272,935, 18 pgs.
Terminal Disclaimer review decision issued Oct. 3, 2017, U.S. Appl. No. 15/272,935, 18 pgs.
Notice of Acceptance of Power of Attomey and Conected Filing Receipt mailed Oct. 6, 2017, U.S. Appl. No. 15/272,935, 4 pgs.
Markowski, "Performance Limits of Switched-Capacitor DC-DC Converters", IEEE PESC'95 Conference, 1995.
Linear Technology data sheet for part LTC3402, "2A, 3MHz Micropower Synchronous Boost Converter", 2000.
Ottman et al., "Optimized Piezoelectric Energy Harvesting Circuit using Step-Down Converter in Discontinuous Conduction Mode", IEEE Power Electronics Specialists Conference, pp. 1988-1994, 2002.

(56) References Cited

OTHER PUBLICATIONS

Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages, Doc 7043.

Xiaoguo Liang et al., Evaluation of Narrow Vdc-Based Power Delivery Architecture in Mobile Computing System, IEEE Transactions on Industry Applications., Nov. 1, 2011, IEEE Service Center, Piscataway, NJ., US.

Xiaoguo Liang et al., "Evaluation of Narrow Vdc-Based Power Delivery Architecture in Mobile Computing System," IEEE Transactions on Industry Applications, vol. 47, No. 6: pp. 2539-2548, Dec. 1, 2011.

Ma et al, "Design and Optimization of Dynamic Power System for Self-Powered Integrated Wireless Sensing Nodes" ACM ISLPED '05 conference (published at pp. 303-306 of the proceedings).

Texas Instruments data sheet for part TPS54310, "3-V to 6-V input, 3-A output synchronous-buck PWM switcher with integrated FETs", dated 2002-2005.

R. Pilawa-Podgurski and D. Perreault, "Merged Two-Stage Power Converter with Soft Charging Switched-Capacitor Stage in 180 nm CMOS," IEEE Journal of Solid-State Circuits, vol. 47, No. 7, pp. 1557-1567, Jul. 2012.

Sun—"High Power Density, High Efficiency System Two-Stage Power Architecture for Laptop Computers" Power Electronic Specialists Conference, pp. 1-7, Jun. 18, 2006, Doc 7596.

Starzyk et al., "A DC-DC Charge Pump Design Based on Voltage Doublers," IEEE Transactions on Circuits and Systems—I. Fundamental Theory and Applications, vol. 48, No. 3, Mar. 2001, pp. 350-359.

Xu et al., "Voltage Divider and its Application in Two-stage Power Architecture," IEEE Twenty-First Annual IEEE Applied Power Electronics Conference and Exposition, pp. 499-504, Mar. 2006.

Luo—"Investigation of Switched-Capacitorized DC/DC Converters" 2009 IEEE 6th Intl. Power Electronics and Motion Control Conference, Wuhan, China, May 17-20, 2009, pp. 1270-1276, 7 pages, Doc 7050.

Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages, Doc 7049.

Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages, Doc 7042.

Yeung, "Multiple Fractional Voltage Conversion Ratios for Switched Capacitor Resonant Converters", Jun. 1, 2001.

David Giuliano, "Miniaturized, low-voltage power converters with fast dynamic response" Thesis (Ph. D.)—Massachusetts Institute of Technology, Department of Electrical Engineering and Computer Science, Sep. 2013.

Wood—"Design, Fabrication and Initial Results of a 2g Autonomous Glider" IEEE Industrial Electronics Society, pp. 1870-1877, Nov. 2005, Doc 7598.

Middlebrook—"Transformerless DC-to-DC Converters with Large Conversion Ratios" IEEE Transactions on Power Electronics, vol. 3, No. 4, pp. 484-488, Oct. 1988, Doc 7592.

Han—"A New Approach to Reducing Outpur Ripple in Switched-Capacitor-Based Step-Down DC-DC Converters" IEEE Transactions on Power Electronics, vol. 21, No. 6, pp. 1548-1555, Nov. 2006, Doc 7589.

Abutbul—"Step-Up Switching-Mode Converter with High Voltage Gain Using a Switched-Capacitor Circuit" IEEE Transactions on Circuits and Systems I, vol. 50, pp. 1098-1102, Aug. 2003, Doc 7587.

Umeno—"A New Approach to Low Ripple-Noise Switching Converters on the Basis of Switched-Capacitor Converters" IEEE Intl. Symposium on Circuits and Systems, vol. 2, pp. 1077-1080, Jun. 1991, Doc 7597.

Pilawa-Podgurski—"Merged Two-Stage Power Converter Architecture with Soft Charging Switched-Capacitor Energy Transfer" 39th IEEE Power Electronics Specialists Conference, 2008, Doc 7594.

Pilawa-Podgurski—"Merged Two-Stage Power Converter with Soft Charging Switched-Capacitor Stage in 180 nm CMOS" IEEE Journal of Solid-State Circuits, vol. 47, No. 7, pp. 1557-1567, Jul. 2012, Doc 7595.

Lei—"Analysis of Switched-Capacitor DC-DC Converters in Soft-Charging Operation" 14th IEEE Workshop on Control and Modeling for Power Electronics, p. 1-7, Jun. 23, 2013, Doc 7590.

Axelrod—"Single-switch single stage switched-capacitor buck converter", Proc. of NORPIE 2004, 4th Nordic Workshop on Power and Industrial Electronics, Jun. 2004, Doc 7588.

Meynard—"Multi-Level Conversion: High Voltage Choppers and Voltage-Source Inverters" IEEE Power Electronics Specialists Conference pp. 397-403, 1992, Doc 7591.

Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages.

Makowski, "Performance Limits of Switched-Capacitor DC-DC Converters", IEEE PESC'95 Conference, 1995.

Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages.

Ng et al. "Switched Capacitor DC-DC Converter: Superior where the Buck Converter has Dominated" PhD Thesis, UC Berkeley, Aug. 17, 2011.

Axelrod et al. "Single-switch single-stage switched-capacitor buck converter", Proc. of NORPIE 2004, 4th Nordic Workshop on Power and Industrial Electronics, Jun. 2004.

Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages.

Pilawa-Podgurski ct al. "Merged Two-Stage Power Converter Architecture with Soft Charging Switched-Capacitor Energy Transfer" 39th IEEE Power Electronics Specialists Conference, 2008.

Pal Andreassen et al, Digital Variable Frequency Control for Zero Voltage Switching and Interleaving of Synchronous Buck Converters, 12th International Power Electronics and Motion Control Conference, Aug. 1, 2006, IEEE, Pi Publication date: Aug. 1, 2006.

Dong Cao, Fang Zheng Peng, Multiphase Multilevel Modular DC DC Converter for High-Current High-Gain TEG Application, vol. 47, Nr.:3, IEEE Transactions On Industry Applications., May 1, 2011, IEEE Service Center, Piscataway, NJ., US, Publication date:May 1, 2011.

Luo et al., "Investigation of switched-capacitorized DC/DC converters," 2009 IEEE 6th International Power Electronics and Motion Control Conference, Wuhan, China, May 17-20, 2009, pp. 1270-1276, doi: 10.1109/IPEMC.2009.5157581.

U.S. Appl. No. 16/919,033: Amended Application Data Sheet filed Jul. 2, 2020, 7 pages.

Cheng, "New generation of switched capacitor converters," PESC 98 Record. 29th Annual IEEE Power Electronics Specialists Conference (Cat. No. 98CH36196), Fukuoka, Japan, May 22, 1998, pp. 1529-1535 vol. 2, doi: 10.1109/PESC.1998.703377.

Cervera et al. "A High Efficiency Resonant Switched Capacitor Converter with Continuous Conversion Ratio," Energy Conversion Congress and Exposition (ECCE), Sep. 2013, pp. 4969-4976.

Y. Lei, R. May and R. Pilawa-Podgurski, "Split-Phase Control: Achieving Complete Soft-Charging Operation of a Dickson Switched-Capacitor Converter," in IEEE Transactions on Power Electronics, vol. 31, No. 1, pp. 770-782, Jan. 2016, doi: 10.1109/TPEL.2015.2403715.

Alon Cervera et al. 'A high efficiency resonant switched capacitor converter with continuous conversion ratio' Energy Conversion Congress and Exposition, IEEE, 2013, pp. 4969-4976.

Chris Levesque et al., U.S. Appl. No. 61/380,522, filed Sep. 7, 2010.
Chris Levesque et al., U.S. Appl. No. 61/417,633, filed Nov. 29, 2010.

Johannes F C M, IPDIA, Freddy Roozeboom et al.

(56) References Cited

OTHER PUBLICATIONS

U.S. Appl. No. 61/380,522, Chris Levesque et al., filed Sep. 7, 2010.
U.S. Appl. No. 61/417,633, Chris Levesque et al., filed Nov. 29, 2010.
Dialog Semiconductor, Mark D. Telefus et al.
Jiang, Jun et al., "Development and Production of ZCS Soft Switching Converter-based Gate Driver IC," 2009 IEEE 8th International Conference on ASIC, Changsha, China, 2009, pp. 1058-1061.
W. Ng, Vincent et al., "Minimum PCB Footprint Point-of-Load DC-DC Converter Realized with Switched-Capacitor Architecture," 2009 IEEE Energy Conversion Congress and Exposition, San Jose, CA, USA, 2009, pp. 1575-1581.
C.N. Pilawa-Podgurski, Robert et al., "Merged Two-Stage Power Converter Architecture with Soft Charging Switched-Capacitor Energy Transfer," 2008 IEEE Power Electronics Specialists Conference, Rhodes, Greece, 2008, pp. 4008-4015.
Yeung, Y.P. Benny et al., "Unified Analysis of Switched-Capacitor Resonant Converters," Aug. 2004, IEEE Transactions on Industrial Electronics, vol. 51, No. 4, pp. 864-873.
Axelrod et al. "Single-switch single-stage switched-capacitor buck converter" Proc. of NORPIE 2004 4th Nordic Workshop on Power and Industrial Electronics Jun. 2004 entire document pp. 1-5 of pdf submission.
Han et al. "A New Approach to Reducing Output Ripple in Switched-Capacitor-Based Step-Down DC-DC Converters" IEEE Transactions on Power Electronics vol. 21 No. 6 pp. 1548-1555 Nov. 2006.
Lei et al. "Analysis of Switched-capacitor DC-DC Converters in Soft-charging Operation" 14th IEEE Workshop on Control and Modeling for Power Electronics pp. 1-7, Jun. 23, 2013.
Ng et al. "Switched Capacitor DC-DC Converter: Superior where the Buck Converter has Dominated" PhD Thesis UC Berkeley Aug. 17, 2011 entire document pp. 1-141 of pdf submission.
O. Abutbul et al. "Step-Up Switching-Mode Converter With High Voltage Gain Using a Switched-Capacitor Circuit" IEEE Transactions on Circuits and Systems I. vol. 50 pp. 1098-1102 Aug. 2003.
Pilawa-Podgurski et al. "Merged Two-Stage Power Converter Architecture with Soft Charging Switched-Capacitor Energy Transfer" 39th IEEE Power Electronics Specialists Conference 2008 pp. 4008-4015.
R. D. Middlebrook "Transformerless DC-to-DC Converters with Large Conversion Ratios" IEEE Transactions on Power Electronics vol. 3 No. 4 pp. 484-488 Oct. 1988.
Sun et al. "High Power Density High Efficiency System Two-Stage Power Architecture for Laptop Computers" Power Electronics Specialists Conference pp. 1-7 Jun. 2006.
T. A. Meynard H. Foch "Multi-Level Conversion: High Voltage Choppers and Voltage-Source Inverters" IEEE Power Electronics Specialists Conference pp. 397-403 1992.
Umeno et al. "A New Approach to Low Ripple-Noise Switching Converters on the Basis of Switched-Capacitor Converters" IEEE International Symposium on Circuits and Systems vol. 2 pp. 1077-1080 Jun. 1991.
Wai-Shan Ng et al. "Switched Capacitor DC-DC Converter: Superior where the Buck Converter has Dominated" Electrical Engineering and Computer Sciences University of California at Berkeley Technical Report No. UCBEECS-2011-94 http:www.eecs.berkeley.eduPubsTechRpts2011EECS-2011-94.html Aug. 17, 2011 141 pgs.
Wood et al."Design Fabrication and Initial Results of a 2g Autonomous Glider" IEEE Industrial Electronics Society pp. 1870-1877 Nov. 2005.

* cited by examiner

POWER SUPPLY FOR GATE DRIVER IN SWITCHED-CAPACITOR CIRCUIT

CROSS REFERENCE TO RELATED APPLICATIONS

This application is a continuation of U.S. application Ser. No. 18/487,119, filed on Oct. 16, 2023, which is a continuation of U.S. application Ser. No. 18/063,703, filed on Dec. 9, 2022, now U.S. Pat. No. 11,837,954, issued on Dec. 5, 2023, which is a continuation of U.S. application Ser. No. 17/451,666, filed on Oct. 21, 2021, now U.S. Pat. No. 11,552,560, issued on Jan. 10, 2023, which is a continuation of U.S. application Ser. No. 16/840,188, filed on Apr. 3, 2020, now U.S. Pat. No. 11,264,895, issued on Mar. 1, 2022, which is a continuation of U.S. application Ser. No. 16/385,320, filed on Apr. 16, 2019, now U.S. Pat. No. 10,644,590, issued on May 5, 2020, which is a continuation of U.S. application Ser. No. 15/813,505, filed on Nov. 15, 2017, now U.S. Pat. No. 10,263,512, issued on Apr. 16, 2019, which is a continuation of U.S. application Ser. No. 15/272,935, filed on Sep. 22, 2016, now U.S. Pat. No. 9,847,715, issued on Dec. 19, 2017, which is a continuation of U.S. application Ser. No. 14/276,426, filed on May 13, 2014, now U.S. Pat. No. 9,502,968, issued on Nov. 22, 2016, which is a continuation of U.S. application Ser. No. 13/837,796, filed on Mar. 15, 2013, now U.S. Pat. No. 8,724,353, issued on May 13, 2014 the contents of which are hereby incorporated by reference in their entirety.

FIELD OF DISCLOSURE

This invention relates to switched capacitor converters, and more particularly to efficient gate drivers for such converters.

BACKGROUND

A switch-mode power converter produces an output voltage by switching reactive elements into different topologies using a switching network. In those cases in which the reactive elements are capacitors, the resulting power converter is referred to as a switched-capacitor power converter. In a typical switched-capacitor converter, the number of capacitors and switches increases as the conversion gain increases.

The switches in such converters must be driven to open and close at opportune times. In those cases in which the switch is implemented as a MOSFET, driving a switch requires causing charge to flow into a gate terminal so as to cause an electric field. In an enhancement mode MOSFET, this electric field causes an inversion layer that permits charge to flow between source and drain.

A circuit that causes charge to flow into a transistor's gate terminal is often called a "gate driver." The charge that enters the gate driver obviously has to come from somewhere. For this reason, a gate driver requires a power supply.

As used herein, conversion gain represents a voltage gain if the switched capacitor power converter produces an output voltage that is larger than the input voltage or a current gain if the switched capacitor power converter produces an output voltage that is smaller than the input voltage.

SUMMARY

In one aspect, the invention features an apparatus that includes first and second pluralities of switches, a controller for controlling these switches, gate-drivers for driving switches from the first plurality of switches, and first and second terminals configured for coupling to corresponding first and second external circuits at corresponding first and second voltages. During operation, the controller causes the first plurality of switches to transition between successive states, each state being characterized by a switch-activation pattern that defines which switches are to be open and which switches are to be closed during the state. These transitions result in the second voltage being maintained at a value that is a multiple of the first voltage. The controller also causes the second plurality of switches to transition between successive states, each state being characterized by a switch-activation pattern that defines which switches are to be open and which switches are to be closed during the state. These transitions resulting in capacitors being coupled or decoupled from the second voltage. The gate drivers derive, from the capacitors, charge for causing a voltage that enables switches from the first plurality of switches to be driven.

In some embodiments, each switch in the first plurality of switches has a maximum voltage rating that is less than whichever of the first and second voltages is greater.

In other embodiments, a first gate-driver from the gate drivers comprises first and second power connections. In such embodiments, a voltage difference between the first and second power connections is less than or equal to twice the lower of the first and second voltages.

Also among the embodiments are those in which a first gate-driver from the gate drivers comprises a first power-connection and a second power-connection. In these embodiments, the first power connection is coupled to one of the capacitors such that a voltage difference between the first and second power connections is less than whichever of the first and second voltages has a higher magnitude.

In yet other embodiments, the switches in the second plurality of switches are implemented by transistors, each of which has a gate voltage and a source voltage. In such embodiments, the apparatus also has a resistor divider that is coupled to the second plurality of switches.

Further embodiments includes those in which a resistor divider couples to the second plurality of switches, with the switches being implemented by transistors, each of which has a gate voltage and a source voltage. In such cases, the resistor divider causes a source voltage of each of the transistors to be at least a threshold voltage below a corresponding gate voltage of the transistor.

Other embodiments include those in which the controller is configured to disable operation of the second plurality of switches after lapse of an interval.

In other embodiments, the switches in the second plurality of switches are implemented by transistors, each of which has a different gate voltage.

In another aspect, the invention features a first switch-set, a controller for controlling switches in the first switch-set, gate-drive circuitry for driving the switches, first and second terminals configured for coupling to corresponding first and second external circuits at corresponding first and second voltages, and nodes for coupling the gate-driving circuitry to a power supply. The power supply includes capacitors that are constituents of a switched-capacitor network that is coupled to the switches. During operation, the controller causes the switches in the first switch-set to transition between successive states, each state being characterized by a switch-activation pattern that defines which switches are to be open and which switches are to be closed during the state. These transitions cause the second voltage to be maintained at a value that is a multiple of the first voltage. The nodes that couple the gate-driving circuitry to the power supply will, in this case, couple them to the capacitors.

Among the embodiments are those in which the first switch-set comprises a first switch that lines along a path between anodes of first and second capacitors. In such embodiments, a voltage difference across the switch while the switch is open is less than a voltage difference between the anodes of the capacitors.

Also among the embodiments are those in which the capacitors comprise a first capacitor set and a second capacitor set. A second switch-set selectively couples the second terminal to capacitors in the first capacitor set while decoupling the second terminal from capacitors in the second capacitor set. Prior to starting steady-state operation of the power supply, the controller causes the switches in the second switch-set to allow the second voltage to drive charge toward the capacitors of the power supply.

Embodiments further include those in which the nodes couple the gate-drive circuitry to anodes of the capacitors.

Yet other embodiments include those in which, during steady-state operation of the power supply, the controller opens the second switches. This has the effect of preventing the second voltage from driving charge toward the capacitors of the power supply.

Also among the embodiments are those in which the capacitors of the power supply comprise a first capacitor-set and a second capacitor-set. The first set comprises a capacitor having a cathode thereof connected to a phase voltage and the second set comprises a capacitor having a cathode thereof connected to a phase-shifted version of the phase voltage.

Further embodiments include those in which the power supply comprises a cascade multiplier.

In still other embodiments, the capacitors comprise a first capacitor and a second capacitor and the gate-drive circuitry comprises first and second gate drives that drive corresponding first and second switches that are in series so that all current passing through the first switch also passes through the second switch. In these embodiments, the first switch connects to an anode of a first capacitor and the second switch connects to an anode of a second capacitor.

Further embodiments include those in which the capacitors comprise first and second capacitor sets and a second switch-set selectively couples the second terminal to capacitors in the first set while decoupling the second terminal from capacitors in the second set.

Other features and advantages of the invention are apparent from the following description, and from the claims.

DETAILED DESCRIPTION

Figure 1:
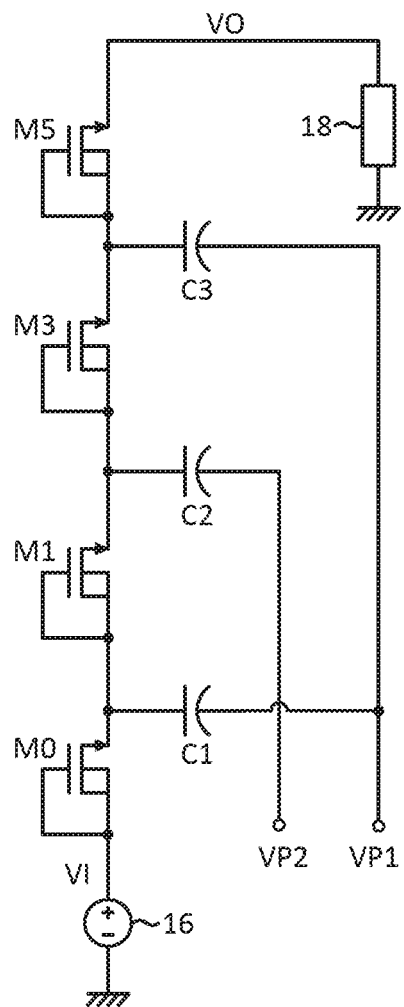
FIG. 1 is a schematic of a single-phase step-up cascade multiplier.
Figure 2:
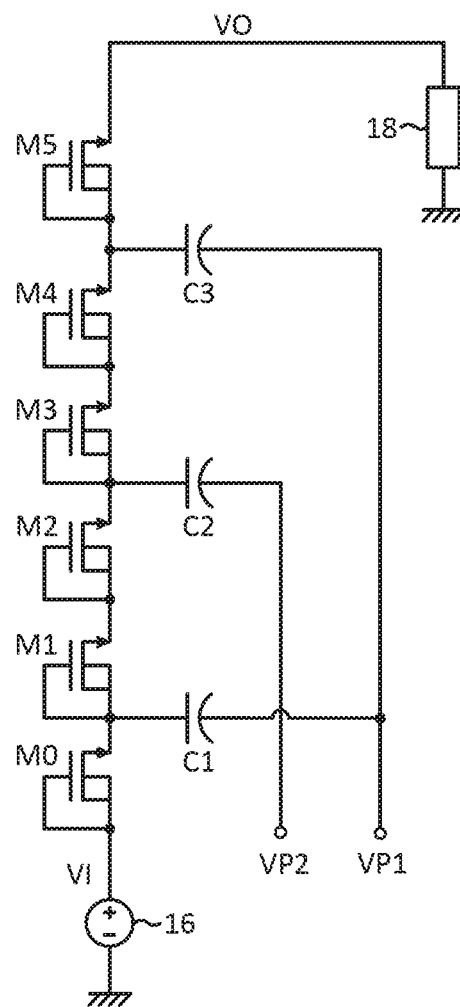
FIG. 2 is a schematic of a single-phase step-up cascade multiplier with cascaded switches.

FIGS. 1-2 show cascade multipliers that receive an input voltage VI from a voltage source 16 and provide an output voltage VO to a load 18. Consistent with conventional circuit representations, a capacitor's anode is shown as a straight line and its cathode is shown as a curved line.

Switches M0-M5 connect the anodes of the capacitors C1-C3 to some other element, which is either the anode of another capacitor or a first or second terminal of the cascade multiplier. The capacitors' cathodes connect to one of two phase voltages VP1, VP2, which are 180-degrees out-of-phase.

In FIG. 1, there is one switch M1 between anodes of two capacitors C1, C2. However, in FIG. 2, there are two switches M1, M2 between the anodes of the same two capacitors.

In normal operation, packets of charge are pumped along a chain of diode-connected NMOS transistors M0-M5 as pump capacitors C1-C3 are successively being charged and discharged. As shown in FIGS. 1-2, phase voltages VP1, VP2 are one hundred and eighty degrees out of phase.

Each of the NMOS transistors M0-M5 is diode-connected, thereby only permitting boost operation (i.e. VO greater than VI). Additionally, the efficiency is severely impacted because a significant amount of voltage is dropped across each of the transistors M0-M5 during normal operation. Therefore, there is a desire to operate the NMOS transistors M0-M5 in their ohmic region, but due difficulty and/or complexity of driving the transistors M0-M5, a combination of both PMOS transistors and high-voltage transistors are typically used.

If the transistors in the switched-capacitor power converter are integrated on a single substrate then it can be desirable to use as few different types of devices as possible. This is because the cost of fabrication increases as the number of mask layers increases. As the number of different types of devices in a semiconductor process increases so does the number of mask layers and hence the cost.

The switches define a power path from a source 16 to a load 18. It is useful to minimize the number of PMOS devices along the power path since hole mobility is somewhat less than electron mobility in silicon. As a result, PMOS devices tend to have higher on-resistance and higher gate capacitance that NMOS devices. It is also desirable to replace as many high-voltage devices with low-voltage devices.

A number of approaches are described below for use in the context of active control of switched capacitor power converters. The approaches address one or more of the following goals:

Increase in efficiency of the converter by reducing the charge deposited and discharged from the gates of control transistors Permitting use of low-voltage transistors for switching.

Generally, an approach to achieving these goals is by efficiently limiting the gate-to-source voltages though the design and powering of circuits driving the switching transistors during operation. A number of specific approaches, some of which are described below, use control circuitry for switching transistors, which couple the capacitors in the charge transfer path, that are themselves powered by capacitors in the same path, and/or by capacitors in different parallel paths in the case of multi-phase converters.

Figure 3:
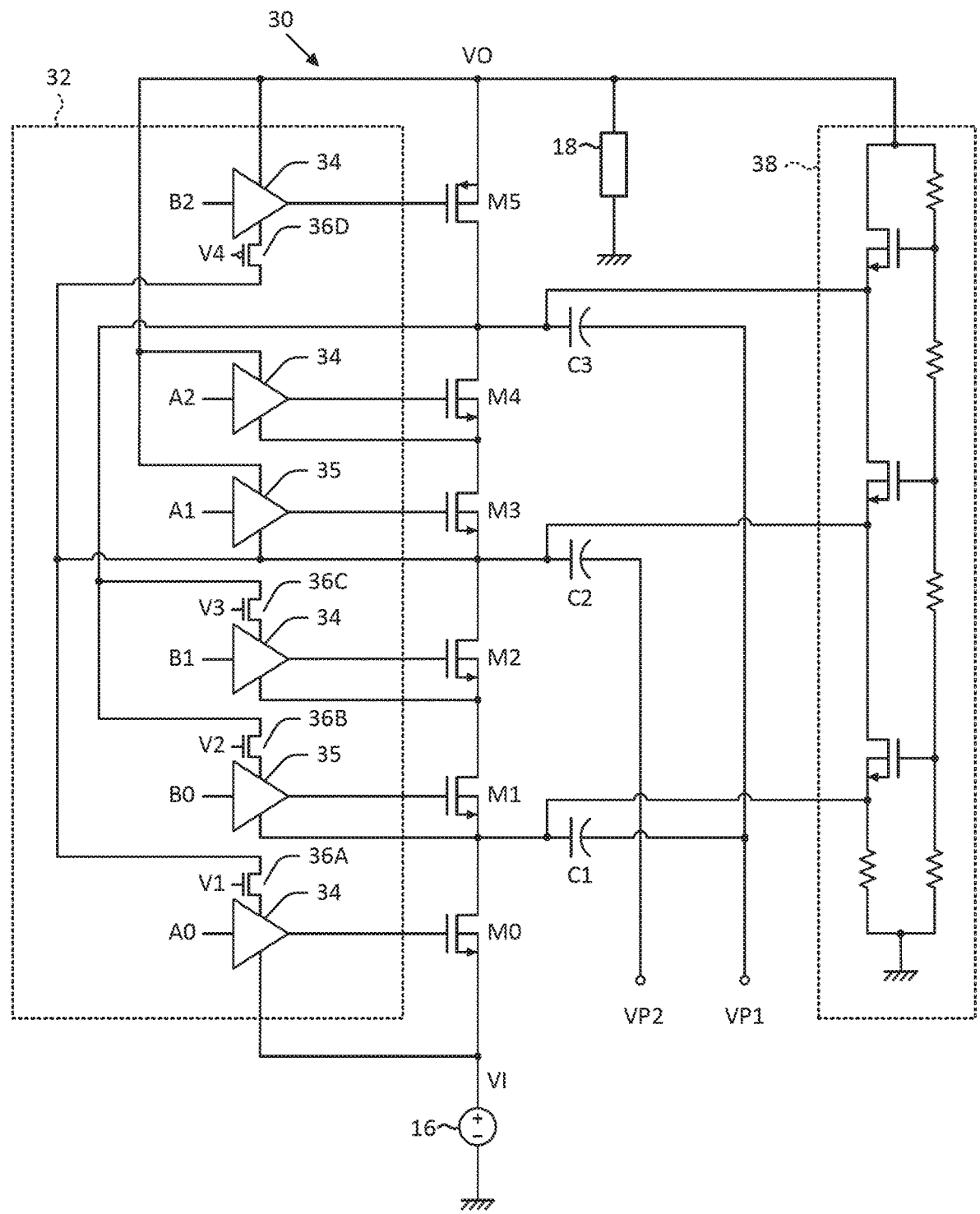
FIG. 3 is a schematic of a single-phase cascade multiplier with cascaded switches and corresponding gate drivers and pre-charging circuit.

Referring to FIG. 3, a single-phase cascade multiplier circuit 30 makes use of transistors M0-M5 coupling to first, second, and third pump capacitors C1-C3 on the charge transfer path between a high-voltage terminal (i.e. VO) and a low-voltage terminal (i.e. VI). In the embodiment illustrated in FIG. 3, the pump capacitors C1-C3 are coupled by cascaded transistor switches (e.g., M1 and M2 in series), but it should be understood that single transistors could also be used while still achieving at least some of the advantages of the configuration shown.

Each transistor is driven by a corresponding gate driver circuit. As described in more detail below, at least some of the gate driving circuits are powered from the pump capacitors C1-C3 in the charge transfer path between the high-voltage terminal and the low-voltage terminal. The voltage across each of the pump capacitors C1-C3 is a fraction of the high voltage, thereby permitting efficient generation of gate driving signals that maintain desired limits on the gate-to-source voltages of the transistors.

A driver set 32 provides the gate signals to activate or de-activate each transistor in the cascade multiplier circuit 30. The driver set 32 includes four low-voltage gate driver circuits 34, two high-voltage gate driver circuits 35, and four voltage followers 36A-36D. Each gate driver circuit receives a driver signal with a label either beginning with an "A" or a "B." The driver signals A0, B0, B1, A1, A2, B2 control transistors M0, M1, M2, M3, M4, M5, respectively. Furthermore, the voltage followers 36A-36D receive corresponding bias voltages V1-V4, respectively. A control circuit (not shown in FIG. 3) generates the driver signals A0-B2 and the bias voltages V1-V4.

The low-voltage gate driver circuits 34 are coupled to the transistors M0, M2, M4, M5, whereas, the high-voltage gate driver circuits 35 are coupled to the transistors M1, M3. The high-voltage gate driver circuits 35 support twice the supply voltage of the low-voltage gate driver circuits 34. Each of the voltage followers 36A-36D receive a voltage from one of the pump capacitors C1-C3 and provides a constant voltage to their corresponding gate driver circuit (i.e. 34 or 35) that is equal to or lower in value. When the received voltage is equal to the provided voltage, the corresponding voltage follower (e.g. 36A) behaves like a switch. To achieve this behavior, the bias voltages VJ-V3 are at least a threshold voltage above the corresponding source voltage while the bias voltage V4 is at least a threshold voltage below the corresponding source voltage. Furthermore, the voltage followers 36A-36D experience the same voltage stress as the transistors M0-M5 in the cascade multiplier circuit 30.

Also illustrated in FIG. 3 is an example of a pre-charge circuit 38 that is used to initialize the voltages on the pump capacitors C1-C3 prior to clocked operation of the cascade multiplier circuit 30. By pre-charging the pump capacitors C1-C3, the drain-to-source voltages across the transistors M0-M5 within the cascade multiplier circuit 30 can be maintained within required limits during startup, and further, the pre-charged pump capacitors C1-C3 can provide the needed power to the gate driving circuits immediately upon the start of clocked operation of the cascade multiplier circuit 30. Upon clocked operation, the pre-charge circuit 38 can be disabled.

To facilitate the use of low-voltage transistors throughout the whole power converter, the pre-charge circuit 38 uses a combination of low-voltage transistors and bias resistors. A resistor divider sets up the pre-charge voltage for each of the pump capacitors C1-C3 during startup, wherein the source voltage of each transistor within the pre-charge circuit 38 is at least a threshold voltage below its corresponding gate voltage. As a result, none of the transistors within either the pre-charge circuit 38 or the cascade multiplier circuit 30 are exposed to voltage stresses that can damage the devices during startup or clocked operation.

Figure 4:
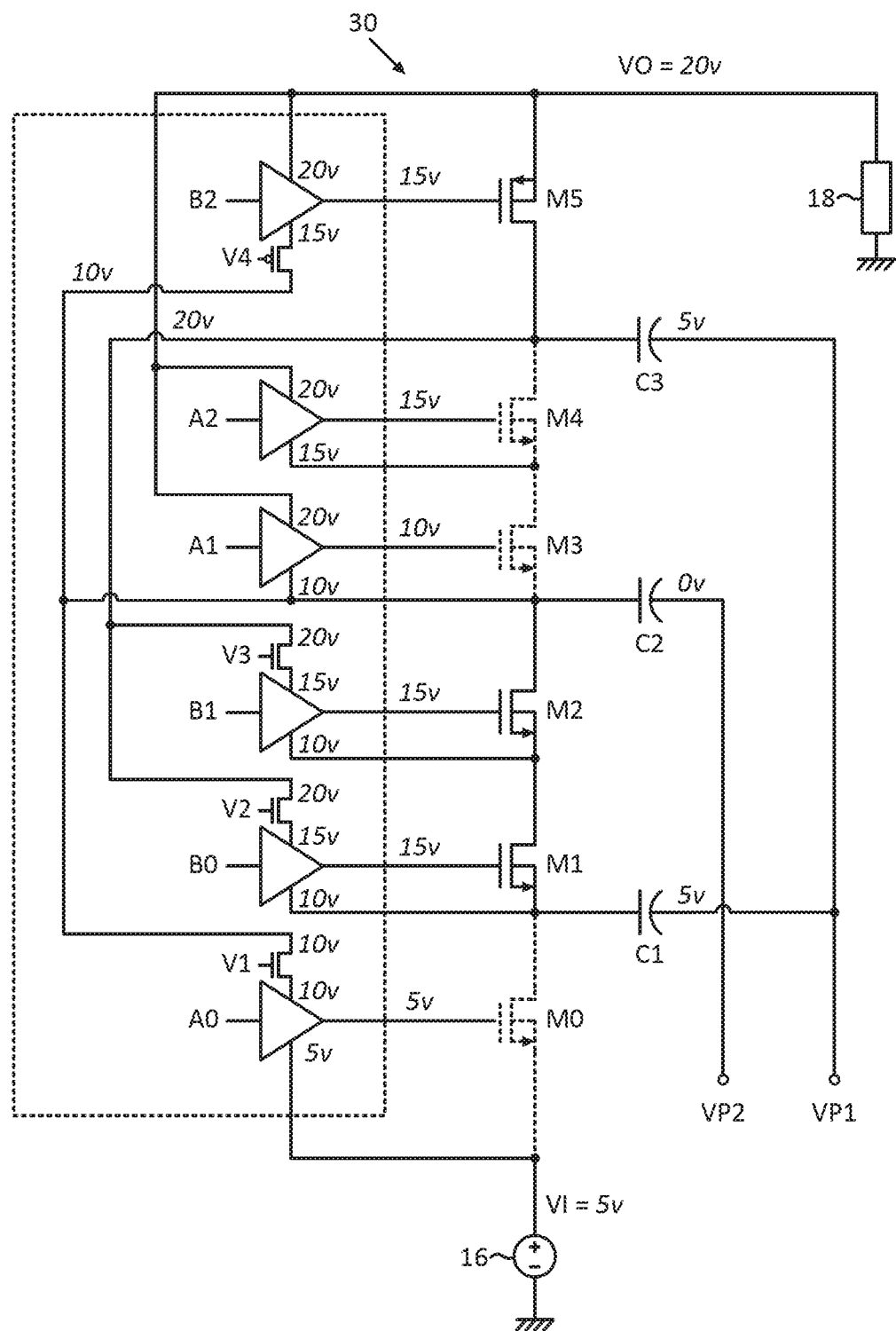
FIGS. 4-5 are annotated schematics of the circuit of FIG. 3 in two phases of operation, respectively.
Figure 5:
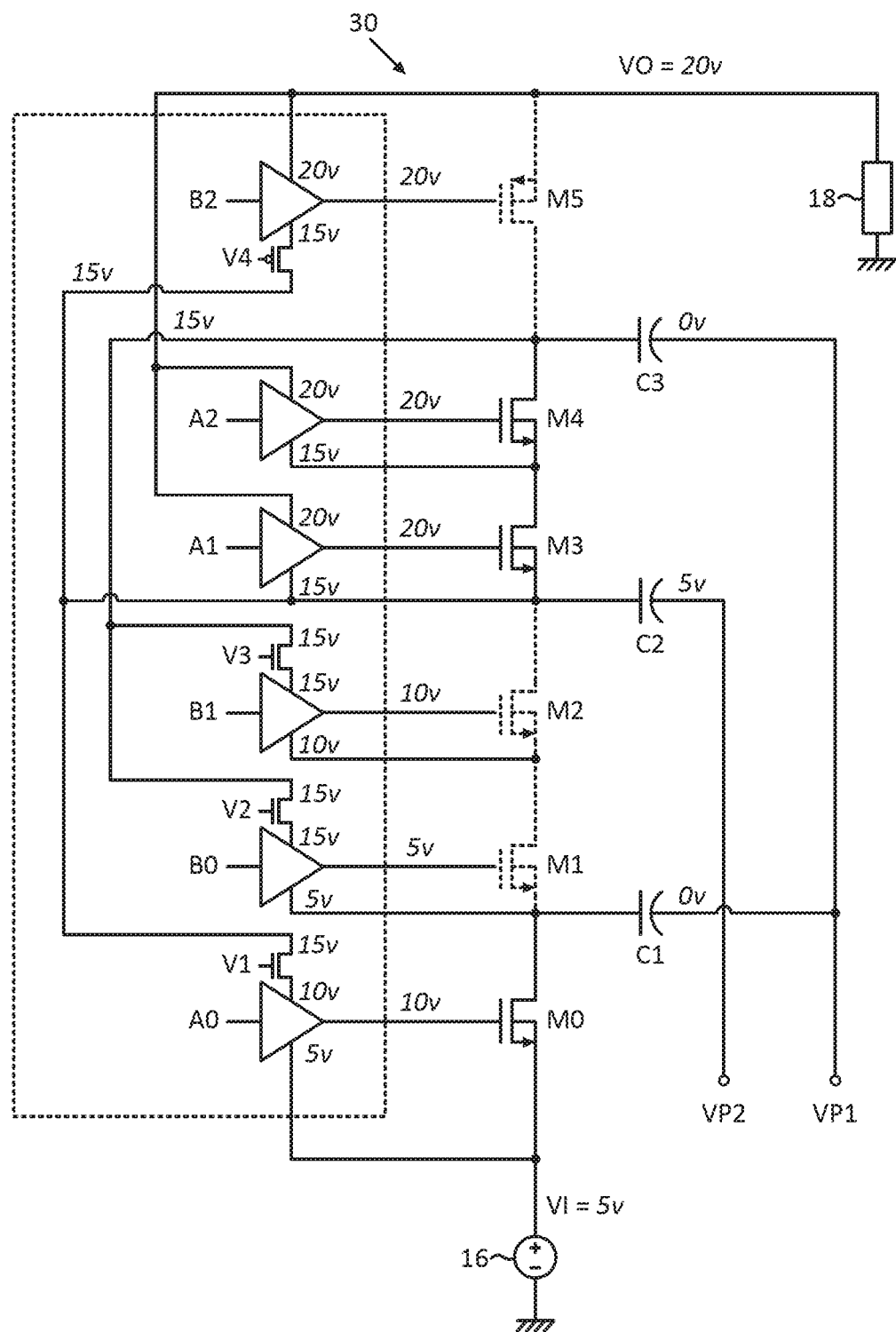

Operation of the cascade multiplier circuit 30 and the resulting voltage levels powering the gate driving circuits can be understood with reference to FIGS. 4-5 that show the two states of operation. The cascade multiplier circuit 30 transfers energy from a source 16 to a load 18 by cycling between a first state and a second state at a specific frequency. All of the transistors coupled with the "A" signals are activated and de-activated at the same time; as is the case for all of the transistors coupled with the "B" signals. To ensure a clean transition between the first and second state, the "A" signals and "B" signals are non-overlapping. Furthermore, first and second phase voltages VP1, VP2 are synchronized with the "A" signals and "B" signals.

Assuming an input voltage VI of five volts, then the cascade multiplier circuit 30 produces an output voltage VO that is twenty volts. The maximum voltage across any transistor is five volts. Furthermore, the low-voltage gate driver circuits 34 support five volts while the high-voltage gate driver circuits 35 must support ten volts.

FIG. 4 illustrates the first state, wherein the first phase voltage VP1 is at five volts while the second phase voltage VP2 is at zero volts. The gate driver circuits that receive a "B" signal activate their corresponding transistors and the gate driver circuits that receive an "A" signal de-activate their corresponding transistors. Consequently, a gate voltage of fifteen volts activates the transistors M1, M2, M5 while gate voltages of five volts, ten volts, and fifteen volts de-activate the transistors M0, M3, M4, respectively.

In contrast, FIG. 5 illustrates the second state, wherein the first phase voltage VP1 is at zero volts while the second phase voltage VP2 is at five volts. The gate driver circuits that receive an "A" signal activate their corresponding transistors and the gate driver circuits that receive a "B" signal de-activate their corresponding transistors. Consequently, gate voltages of five volts, ten volts, and twenty volts de-activate the transistors M1, M2, M5, respectively; while gate voltages of ten volts, twenty volts, and twenty volts activate the transistors M0, M3, M4, respectively.

Unfortunately, the voltage followers 36A-36D associated with the transistors M0, M1, M2, M5 consume power. Each voltage follower drops five volts across its drain and source terminals while sinking or source current for its corresponding gate driver. In the case of the transistors M1, M2, M5, this occurs during the first state while for transistor MO this occurs during the second state.

In the cascade multiplier circuit 30, charge transfers to the load 18 from the source 16 at a rate dictated by the load 18. Because this is a single-phase design, there is only one charge transfer path that a unit of charge can follow. For example, at the start of a first clock cycle, the unit of charge leaves the source 16 and flows into the first pump capacitor C1. After a state transition, the unit of charge moves to the second pump capacitor C2. When a second clock cycle begins, the unit of charge then moves from the second pump capacitor C2 to the third pump capacitor C3 and after one more state transition, the unit of charge finally reaches the load 18. It took two full clock cycles (i.e. four consecutive states) for the initial charge to reach the load 18 from the source 16.

In general, as the conversion gain of a cascade multiplier increases, the number of pump capacitors increases. Consequently, it takes a longer time for a unit of charge from the source 16 to reach the load 18 because the unit of charge needs to bounce between more pump capacitors. The number of clock cycles in the charge transfer path is M-2, where M is equal to the conversion gain. In this example, M is equal to four; therefore, the number of clock cycles is two.

Figure 6:
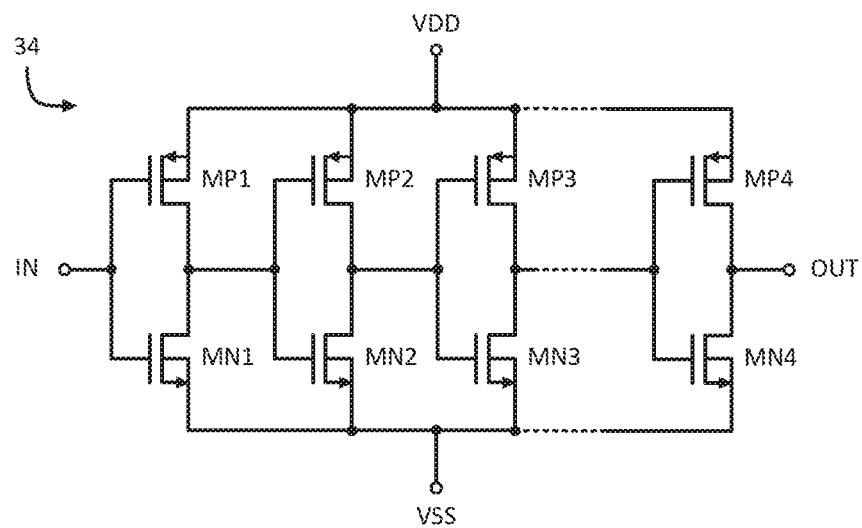
FIG. 6 is a schematic of a tapered gate driver.
Figure 7:
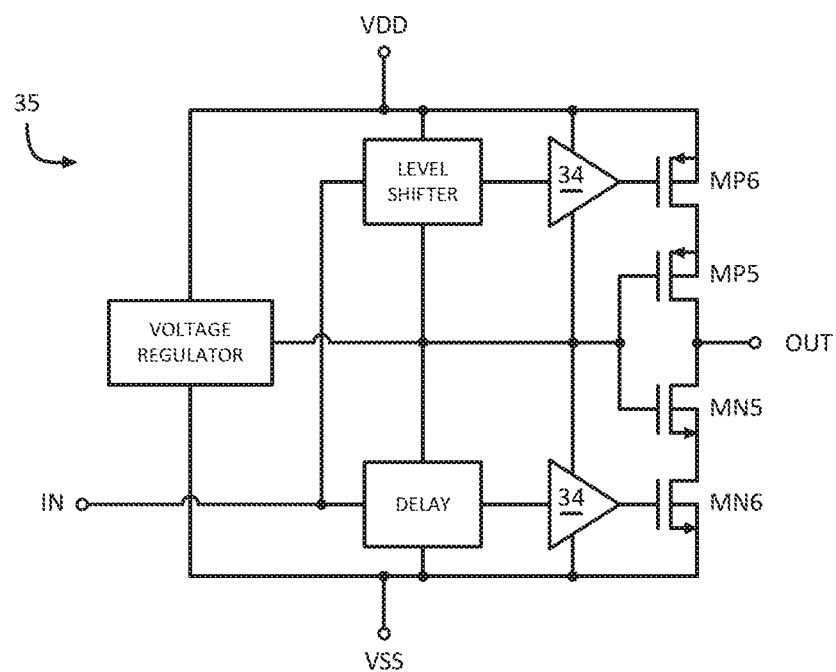
FIG. 7 is a schematic of a cascaded gate driver.

FIGS. 6-7 illustrate two alternative designs of the gate driving circuits. Both of which can be used for the high-voltage gate driver circuits 35 and the low-voltage gate driver circuits 34. However, as will be made clear in the following description, the gate driver in FIG. 6 is more suitable for the low-voltage gate driver 34 while the gate driver in FIG. 7 is more suitable for the high-voltage gate driver 35.

As illustrated in FIG. 6, a tapered gate driver features an input terminal IN, an output terminal OUT, and supply terminals VDD, VSS. The input terminal IN couples with the output terminal OUT through first, second, third, and fourth inverters, in that order. The four inverters include high-side PMOS transistors MP1-MP4 and low-side NMOS transistors MN1-MN4. Due to the difference in electron and hole mobilities, each of the PMOS transistors MP1-MP4 is typically sized larger than their corresponding NMOS transistors MN1-MN4.

Starting at the input terminal IN, each subsequent inverter is k times larger than the previous inverter. For example, if k is equal to five and the width of the first inverter is one micron, then the width of the second, third, and fourth inverters is five microns, twenty-five microns, and one hundred and twenty-five microns, respectively. By tapering the inverters, a small logic gate coupled to the input terminal IN is able to drive a large power transistor coupled to the output terminal OUT.

The maximum supply voltage of the tapered gate driver is equal to or less than the breakdown voltage of the transistors. Therefore, the tapered gate driver is a good choice for the low-voltage gate driver circuits 34 in the cascade multiplier circuit 30. Unfortunately, due to the higher voltage requirements of the high-voltage gate driver circuit 35 in FIGS. 3-5, the tapered gate driver circuit requires transistors with twice the breakdown voltage.

An alternative method of increasing the supply voltage without the need of higher voltage transistors is to use a cascaded gate driver. As illustrated in FIG. 7, a cascaded gate driver includes an input terminal IN, an output terminal OUT, and supply terminals VDD, VSS. The cascaded gate driver features an output stage that includes first and second high-side transistors MP5, MP6 and first and second low-side transistors MN5, MN6. The output stage requires additional support circuitry, such as a level shifter, two gate drivers, a delay block, and a voltage regulator, all of which can be designed using transistors with the same breakdown voltage as that of the transistors in the output stage.

During normal operation of the cascaded gate driver, the high-side transistors MP5, MP6 are activated when the low-side transistors MN5, MN6 are de-activated and vice-versa. Therefore, the cascaded gate driver can support twice the supply voltage because the differential voltage across the supply terminals VDD, VSS is always supported by two de-activated transistors. In general, a larger number of transistors can be cascaded to increase the supply voltage further. For example, if the output stage included three high-side transistors and three low-side transistors then the maximum supply voltage would be tripled and so on. Unfortunately, as the number of cascaded transistors increases, so does the complexity of the support circuitry.

Figure 8:
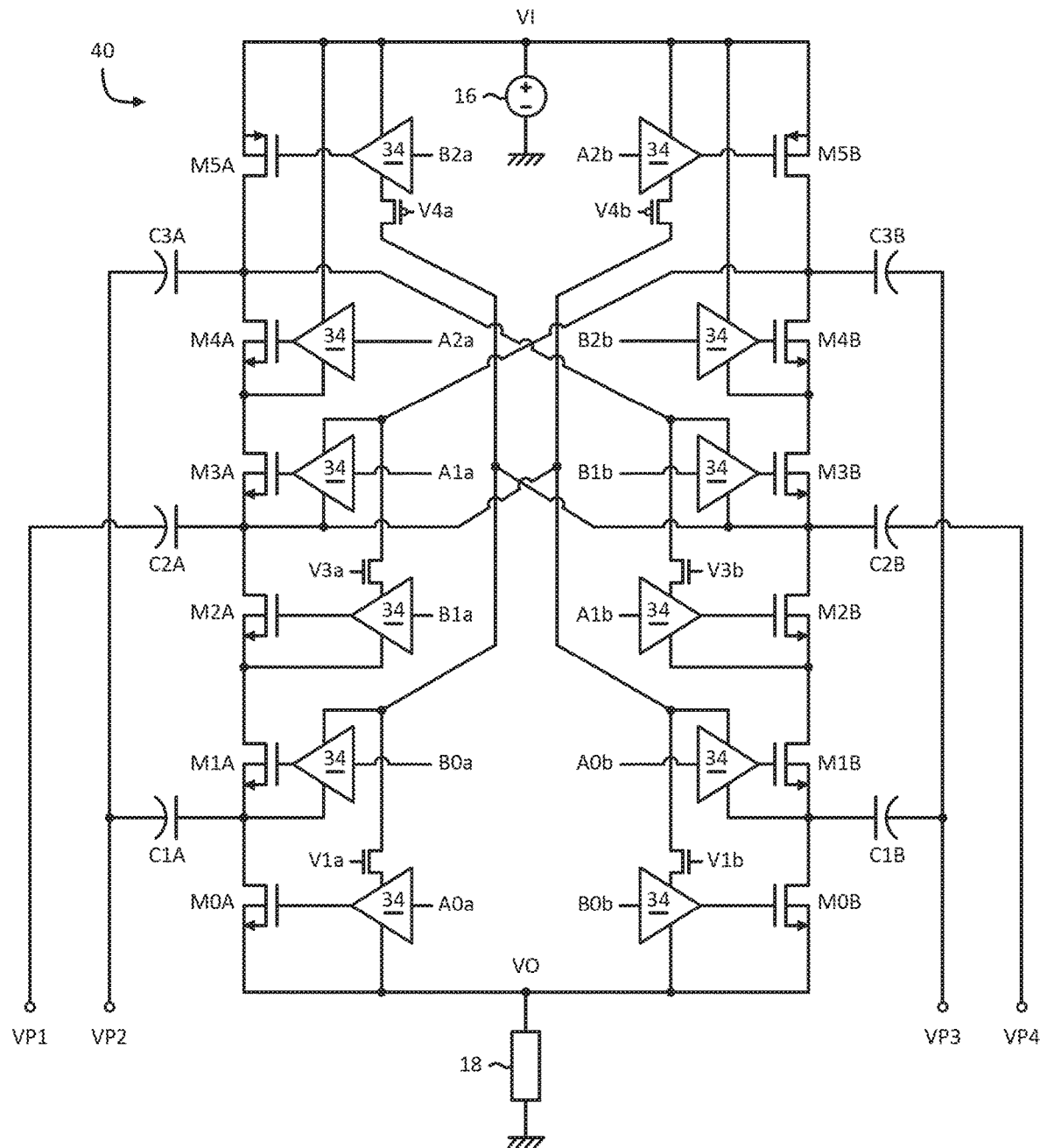
FIG. 8 is a schematic of a dual-phase cascade multiplier with cascaded switches and corresponding gate drivers.

In general, a single-phase cascade multiplier can be converted into a multi-phase cascade multiplier featuring multiple charge transfer paths that are shifted in time. As illustrated in FIG. 8, a dual-phase cascade multiplier circuit 40 can be constructed by placing two copies, of the single-phase cascade multiplier circuit 30 in parallel. Each copy is referred to as a phase (not to be confused with state), therefore, the cascade multiplier circuit 30 features a first phase and a second phase. The first phase includes capacitors C1A-C3A, transistors M0A-M5A, and phase voltages VP1, VP2 while the second phase includes capacitors C1B-C3B, transistors M0B-M5B, and phase voltages VP3, VP4. Each of the transistors M0A-M5B has a corresponding gate driver circuit 34 that receives a driver signal with a label either beginning with an "A" or a "B". The first phase includes driver signals A0a-B2a while the second phase includes driver signals A0b-B2b.

The control signals of the first phase and the second phase are shifted by one-hundred and eighty degrees. This can be achieved by swapping the "A" and "B" signals in one of the two phases and then inverting the corresponding phase voltages. For example, in normal operation, the phase voltages VP1, VP3 are high when the phase voltages VP2, VP4 are low and vice versa. Furthermore, the voltage followers in the first phase receive bias voltages V1a-V4a while the voltage followers in the second phase receive bias voltage V1b-V4b. As in the previous single-phase example, a control circuit (not shown in FIG. 8) can generate the drivers signals A0a-B2b and the bias voltages V1a-V4b.

Additionally, by having the source 16 and the load 18 trade places, a step-down power converter can be converted into a step-up converter and vice versa. Therefore, the cascade multiplier circuit 40 is step-down power converter instead of a step-up power converter as in FIG. 3.

There are several benefits of a dual-phase construction over a single-phase construction. The most obvious benefit is that there is always a charge transfer path between the source 16 and the load 18 regardless of the state of operation (first or second). A less obvious benefit is that the one phase can derive energy from an alternate phase to power circuitry and vice versa. Furthermore, this technique allows the cascade multiplier circuit 40 to only use low-voltage gate driver circuits 34.

Figure 9:
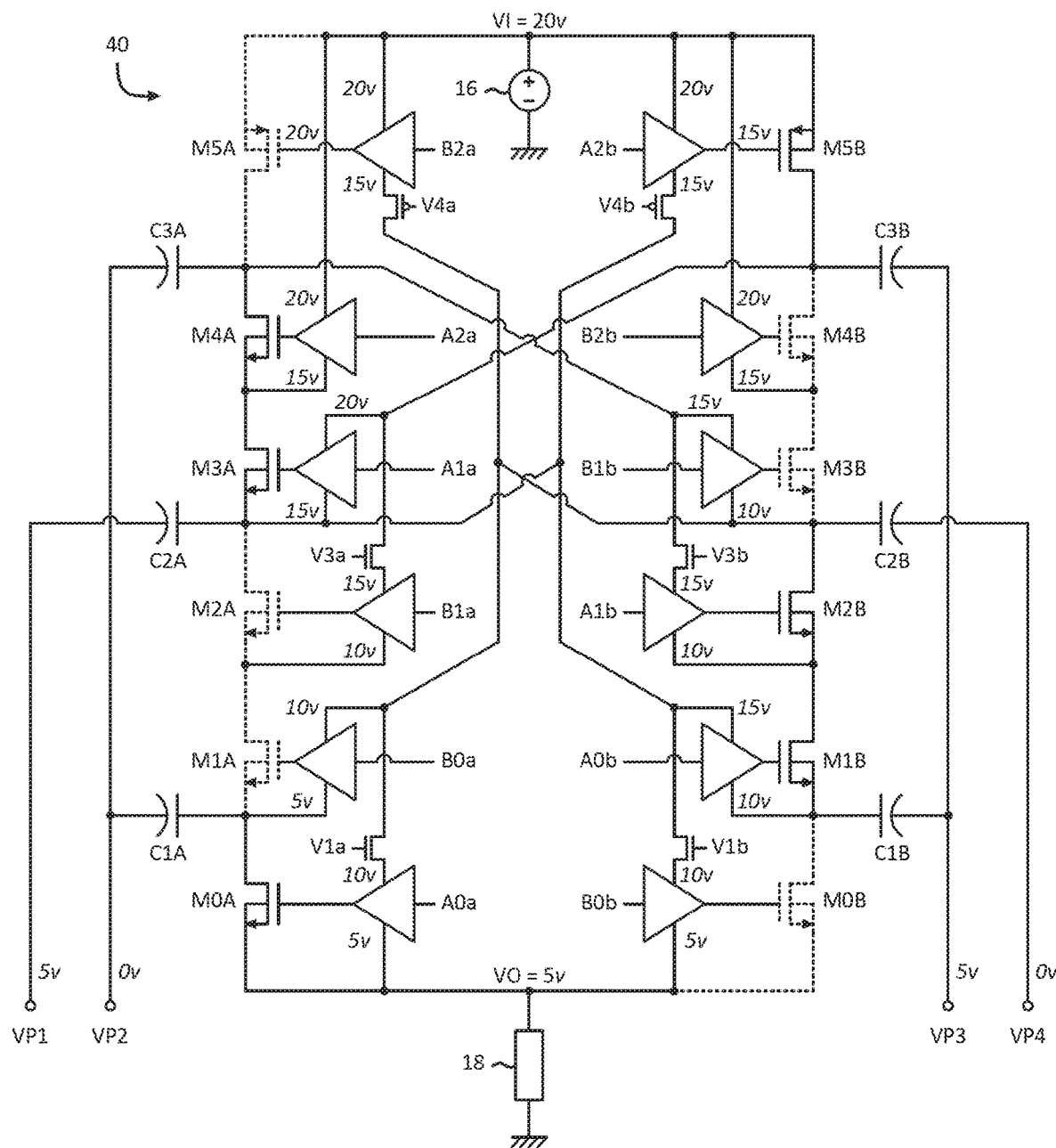
FIG. 9 is an annotated schematic of the circuit of FIG. 8 in one of two phases of operation.

Since a dual-phase converter is essentially two single-phase converters operated in parallel, the cascade multiplier circuit 40 operates as described in connection with FIGS. 3-5. Assuming the input voltage VI is twenty volts, the resulting voltage levels powering the gate driving circuits can be understood with reference to FIG. 9 that show one state of operation. The other state of operation is not shown because it is simply a mirror image of the state shown in FIG. 9.

In the cascade multiplier circuit 40, the transistors M0A-M3B derive power from opposing phases while the transistors M4A-M5B derive power from the input voltage VI. Powering the gate drivers from a parallel charge transfer path (i.e. opposing phase) results in one less voltage follower per phase and the voltage followers do not consume power. This is because the transistors M0A, M2A, M5A, M0B, M2B, M5B are de-activated while voltage is being dropped across their corresponding voltage followers. Because of the more efficient voltage followers and the lack of high-voltage gate driver circuits 35, the energy required to drive the gates in a dual-phase design is less than a single-phase design.

As in the single-phase construction of FIG. 3, it takes two full clock cycles for the initial charge into the cascade multiplier circuit 40 to reach the load 18. However, in the dual-phase construction, there are two charge transfer paths between the source 16 and the load 18, instead of one, as in the single-phase construction. Furthermore, the two distinct charge transfer paths are shifted in time with respect to each other.

For example, a first unit of charge from the source 16 enters a first charge transfer path at the input of the cascade multiplier circuit 40. During each state transition, the first unit of charge hops between the positive terminals of the capacitors C3B, C2B, C1B, in that order, thereby being delivered to the load 18 after four state transitions. Similarly, in a second charge transfer path, a second unit of charge leaves the source 16 and then precedes to hop between the positive terminals of the capacitors C3B, C2B, C1B each state transition. After the fourth state transition, the second unit of charge is delivered to the load 18. By shifting the first and second charge transfer paths one hundred and eighty out of phase, a path for charge always exists between the source 16 and the load 18.

Figure 10:
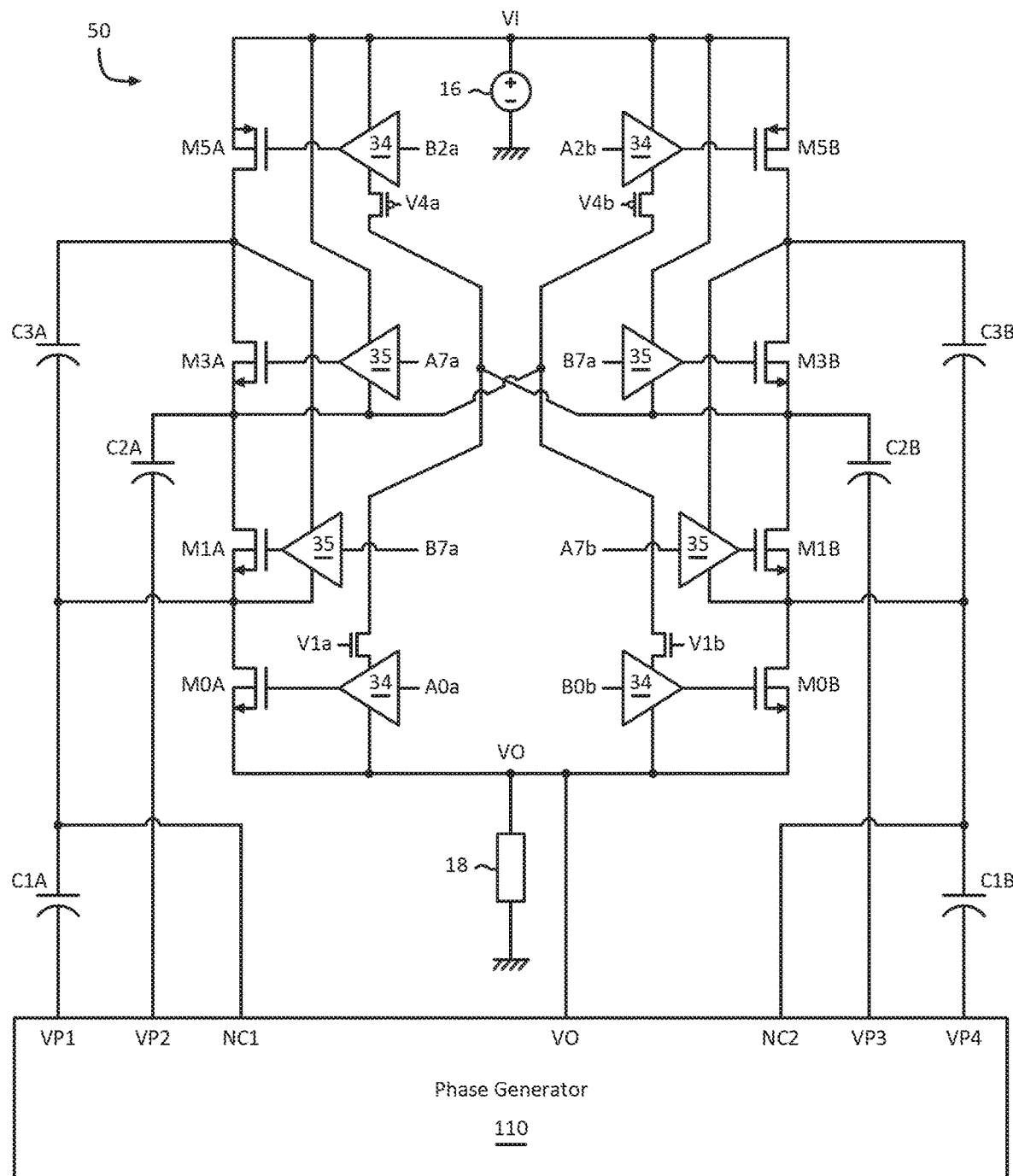
FIG. 10 is a schematic of a dual-phase cascade multiplier and corresponding gate drivers.

It should be appreciated that the above described dual-phase cascade multiplier circuit 40 is one of many different implementations. FIG. 10 illustrates an alternative dual-phase cascade multiplier circuit 50, formed by removing the cascade switches M2A, M4A, M2B, M4B in the cascade multiplier circuit 40, thereby reducing control complexity and perhaps improving robustness. Unfortunately, without the cascade switches, all of the inner switches M1A, M3A, M1B, M3B need to support twice the output voltage VO as well as their corresponding gate drivers 35.

Additionally, the pump capacitors C3A, C3B in the cascade multiplier circuit 50 are pumped in series with their corresponding pump capacitors C1A, C1B, compared to being pumped in parallel as in the cascade multiplier circuit 40. The series arrangement reduces the voltage across the pump capacitors C3A, C3B. For example, if the output voltage VO is five volts, then the voltage across the capacitors C3A, C3B is ten volts in FIG. 10 compared to fifteen volts in FIG. 8. Due to the similarity between the cascade multiplier circuits 40, 50, the cascade multiplier circuit 50 operates as described in connection with FIG. 10

In addition to efficient generation of gate driving signals, the capacitor voltages can also be used to efficiently drive the phase signals that drive the capacitors. Two examples of the phase generator 110 are shown in FIGS. 11-12, suitable to use with the dual-phase cascade multiplier circuit 50 shown in FIG. 10.

Figure 11:
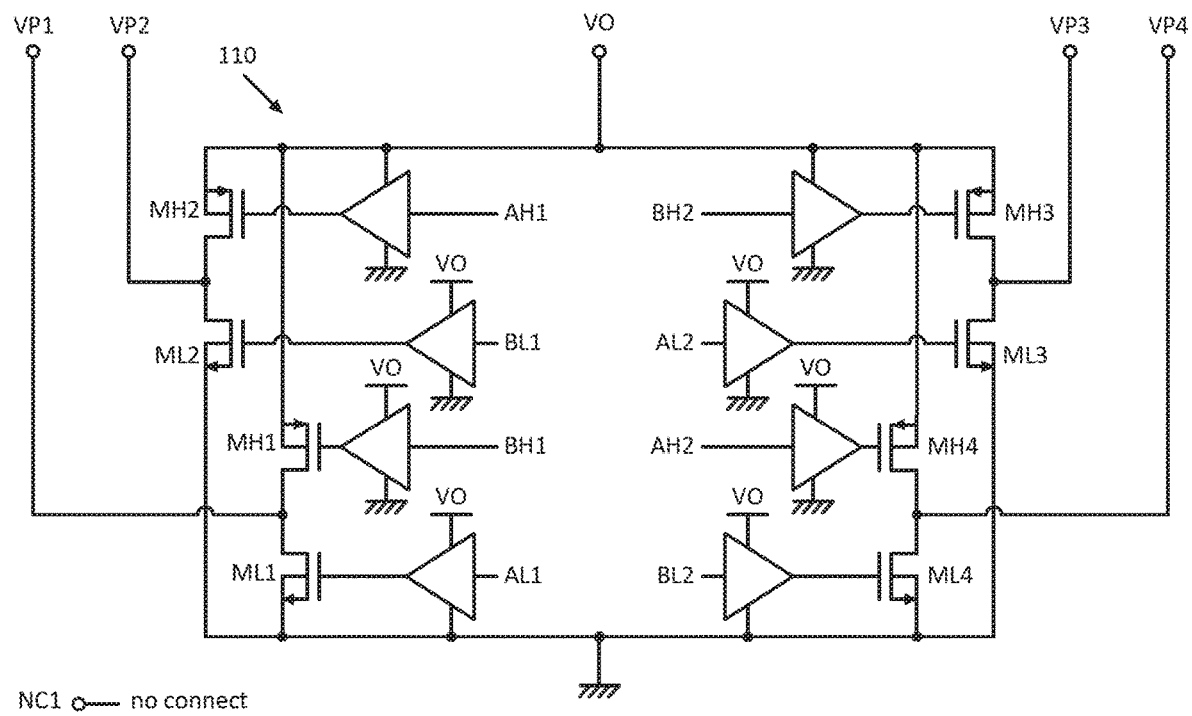
FIGS. 11-12 are schematics of two alternative phase generators for use with the circuit of FIG. 10.
Figure 12:
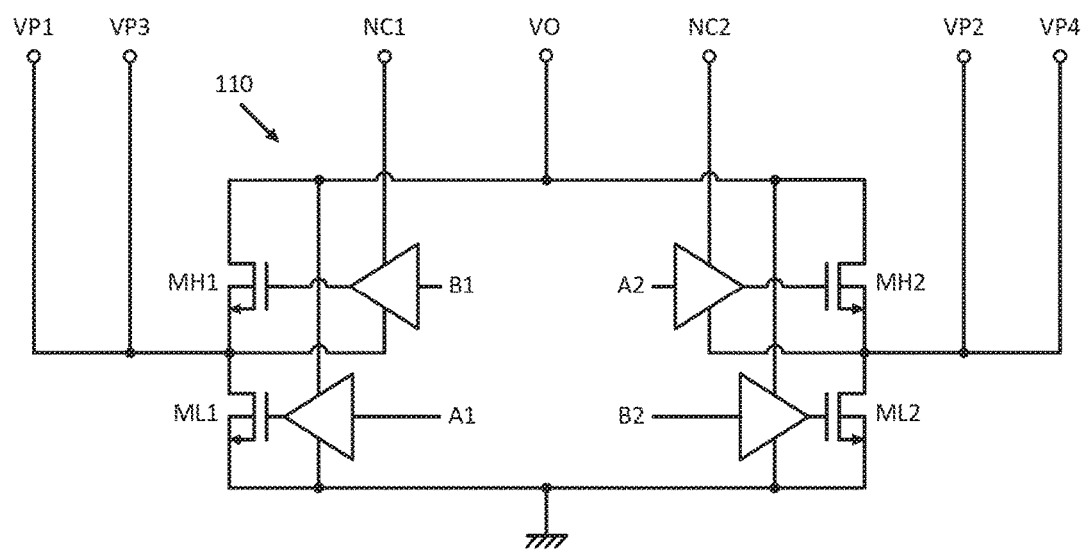

FIG. 11 illustrates a phase generator 110 that receives an output voltage VO and produces first, second, third, and fourth phase voltages VP1-VP4. The first and second phase voltages VP1, VP2 correspond to the first phase of the cascade multiplier circuit 50 while the third and fourth phase voltages VP3, VP4 correspond to the second phase of the cascade multiplier circuit 50.

The phase generator 110 features four transistor pairs, wherein each transistor pair generates one of the phase voltages VP1-VP4. A first pair of transistors MH1, ML1 generates the first phase voltage VP1; a second pair of transistors MH2, ML2 generates the second phase voltage VP2; a third pair of transistors MH3, ML3 generates the third phase voltage VP3; and a fourth pair of transistors MH4, ML4 generates the fourth phase voltage VP4. In each transistor pair, the high-side transistor (e.g. MH1) is a PMOS device while the low-side transistor (e.g. ML1) is a NMOS device.

Separate gate driver circuits control each transistor in the phase generator 110, thereby allowing tri-state operation of each transistor pair. The output voltage VO powers each gate driver circuit. The gate driver circuits can be implemented using numerous circuit topologies, such as the tapered gate driver illustrated in FIG. 6. Each gate driver circuit receives a driver signal with a label beginning with either an "A" or a "B". The driver signals AL1, BL1, AL2, BL2 control low-side transistors ML1, ML2, ML3, ML4, respectively while the driver signals BH1, AH1, BH2, AH2 control high-side transistors MH1, MH2, MH3, MH4, respectively.

In normal operation, the phase generator 110 cycles between a first state and a second state at a specific frequency. During the first state, the gate driver circuits that receive a "B" signal activate their corresponding transistors and the gate driver circuits that receive an "A" signal de-activate their corresponding transistors. Consequently, the first and third phase voltages VP1, VP3 are equal to the output voltage VO while the second and fourth phase voltages VP2, VP4 are equal to zero volts.

In contrast, during the second state, the gate driver circuits that receive a "B" signal de-activate their corresponding transistors and the gate driver circuits that receive an "A" signal activate their corresponding transistors. Consequently, the first and third phase voltages VP1, VP3 are equal to zero volts while the second and fourth phase voltages VP2, VP4 are equal to the output voltage VO.

FIG. 12 illustrates an alternative phase generator 110 that receives an output voltage VO and produces first, second, third, and fourth phase voltages VP1-VP4. In a dual-phase design, the first and third phase voltages VP1, VP3 are in phase; and the second and fourth phase voltages VP2, VP2 are in phase. Consequently, as illustrated in FIG. 12, the first and third phase voltages VP1, VP3 can be shorted together and the second and fourth phase voltages VP2, VP4 can be shorted together.

Additionally, high-side transistors MH1, MH2 can utilize NMOS transistors instead of PMOS transistors as in FIG. 11. The higher mobility of electrons in NMOS transistors allows for the use of smaller high-side transistors MH1, MH2, thereby reducing the energy required to activate. Because NMOS transistors require a gate voltage higher than their source to activate, the high-side transistors MH1, MH2 derive this boost voltage from the pump capacitors within the cascade multiplier that the phase generator 110 is driving.

For example, if the phase generator 110 is coupled to the cascade multiplier circuit 50, then the gate driver of the high-side transistor MH1 is coupled to the positive terminal of the pump capacitor C1A from phase one. In contrast, the gate driver of the high-side transistor MH2 is coupled to the positive terminal of the pump capacitor C1B from phase two. Therefore, each gate driver and its corresponding high-side transistor is powered by a pump capacitor from a distinct parallel charge transfer path.

Because of the similarity of the phase generators 110 in FIGS. 11-12, the operation of the phase generator 110 in FIG. 12 operates as described in connection with FIG. 11. The differences mainly being the shorted phase voltages and boosted high-side transistors MH1, MH2.

Figure 13:
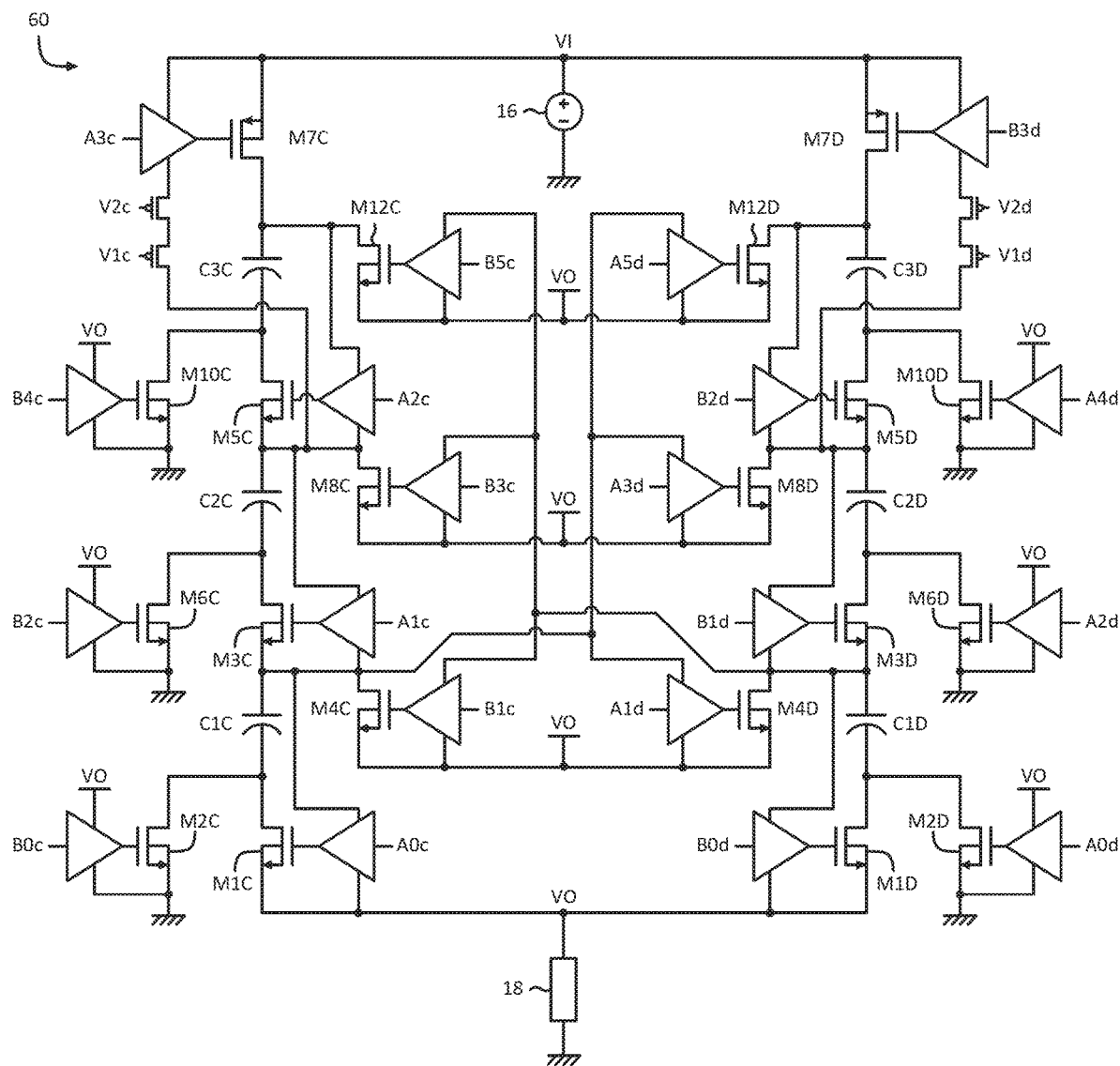
FIG. 13 is a schematic of a dual-phase series-parallel switched capacitor converter and corresponding gate drivers.

A number of alternatives to the switched capacitor power converter designs discussed make use of the approaches embodied in those designs. For example, the converter illustrated in FIG. 13 is a dual-phase series-parallel switched capacitor circuit that includes some gate drivers that are powered by capacitors in either the same charge transfer path or a parallel charge transfer path.

The switched capacitor circuit 60 includes a pair of phases. A first phase includes capacitors C1C-C3C, odd transistors M1C-M7C, and even transistors M2C-M12C. Similarly, a second phase includes capacitors C1D-C3D, odd transistors M1D-M7D, and even transistors M2D-M12D. All of the transistors coupled with signals having an "A" prefix through corresponding gate drivers are activated and de-activated at the same time; as is the case for all of the transistors coupled with signals having a "B" prefix through corresponding gate drivers.

The switched capacitor circuit 60 produces an output voltage VO that is four times lower than an input voltage VI by cycling between a first state and a second state at a specific frequency. During the first state, the first phase odd transistors M1C-M7C and the second phase even transistors M2D-M12D are activated while the first phase even transistors M2C-M12C and the second phase odd transistors M1D-M7D are de-activated. This switch activation pattern places the second phase capacitors C1D-C3D in parallel with the load 18 and places a series arrangement of the first phase capacitors C1C-C3C in between the source 16 and the load 18.

In contrast, during the second state, the first phase odd transistors M1C-M7C and the second phase even transistors M2D-M12D are de-activated while the first phase even transistors M2C-M12C and the second phase odd transistors M1D-M7D are activated. This switch activation pattern places the first phase capacitors C1C-C3C in parallel with the load 18 and places a series arrangement of the second phase capacitors C1D-C3D in between the source 16 and the load 18.

Unlike either of the dual-phase cascade multiplier circuits 40 or 50, within a single phase of the switched capacitor circuit 60, the gate drivers derive their power from capacitors in both phases. For example, the gate drivers for the corresponding transistors M1C, M3C, MSC are powered from the capacitors C1C, C2C, C3C, respectively while the gate drivers for the corresponding transistors M4C, MBC, M12C are powered from the capacitor C1D.

Furthermore, the voltage stress across the transistors in a series-parallel switched capacitor power converter can be quite high in comparison to cascade multipliers. Assuming the input voltage VI is equal to twenty volts then the maximum voltage across the transistors M12C, M12D is fifteen volts. In this embodiment, the gate-to-source voltage is always five volts and the gate drivers for the top PMOS transistors require two series connected voltage followers that are biased using voltages V1 $c$-V2$d$.

Although described in the context of single-phase and dual-phase converters, it should be understood that other multi-phase converter configurations can be used. For example, a four-phase cascade multiplier can be constructed by placing two copies of the cascade multiplier circuit 40 in parallel and shifting their respective clocks by ninety degrees. Adding an even number of phases is straightforward because every subsequent pair of phases can be run in isolation.

However, if the switched capacitor power converter includes an odd number of phases, it is a little more difficult to power gate drivers from capacitors in different parallel charge transfer paths. In this case, each gate driver draws power from capacitors in multiple parallel charge transfer paths, as compared to a single parallel charge transfer path in the even-numbered phase case.

In general, switched capacitor converters feature a large number of switches and capacitors. By necessity, at least a few of the switches are floating, which means that neither switch terminal is attached to a constant electric potential. It should be appreciated that switched capacitor converters that have at least one floating switch can benefit by deriving power from the same charge transfer path or a parallel charge transfer path. Examples of such switched capacitor converters include the cascade multiplier, series-parallel, parallel-series, Fibonacci, and voltage-doubler topologies.

The switched capacitor power converters and the associated gate drivers illustrated herein can all be integrated on one or multiple semiconductor substrates. If all of the transistors are integrated on a single substrate and any of the transistors are floating then the transistors must be isolated from the substrate. For example, in a CMOS process, NMOS transistors are typically formed in a p-type substrate. These devices can only float if the bulk of the NMOS transistors is isolated from the substrate. If this were not the case, then an alternative possibility would be to use multiple semiconductor substrates.

The capacitors in a switched capacitor power converter can either be integrated, discrete, or a combination thereof. The discrete capacitors are typically multi-layer ceramic capacitors while the integrated capacitors are typically planar or trench capacitors. If the capacitors are integrated, then they can be integrated on the same wafer with their switches, or they can be integrated on a separate wafer, or a combination thereof. Furthermore, if the capacitors and switches are on different wafers then there are various attachment methods, some of which remove the pin count limitation of the overall converter.

The ability to re-purpose the pump capacitors is of benefit when the switched capacitor power converter uses either integrated capacitors or discrete capacitors. If discrete capacitors are used, then each capacitor uses at least one pin. Adding extra pins for the gate driver circuitry is quite painful because pins on an integrated circuit are of limited supply for a given die area. On the other hand, integrated capacitors do not eat into your pin count, but they are quite expensive and have a low capacitance per area so it is valuable to limit their use.

Typically, a controller produces control signals for activating and de-activating the switches within a switched capacitor power converter. For example, in most of the embodiments described above, a controller could have generated the driver signals that are labeled with an "A" or a "B" prefix. By controlling the on and off time of the individual switches, a controller can provide many functions. A few such functions include the ability to regulate the output voltage, the ability to shut off the power converter in the event of a fault condition, and the ability to change the gain of the switched capacitor network.

Various features, aspects, and embodiments of switched capacitor power converters have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications. Additionally, the terms and expressions which have been employed herein are used as terms of description and not of limitation. There is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

Having described the invention and a preferred embodiment thereof, what is claimed as new and secured by Letters Patent is:

1. An integrated circuit, comprising:
   a plurality of first power switches configured to be coupled to one or more first flying capacitors to form a first phase of a charge pump circuit;
   a plurality of second power switches configured to be coupled to one or more second flying capacitors to form a second phase of the charge pump circuit, wherein each first power switch of the plurality of first power switches corresponds to a respective one second power switch of the plurality of second power switches, and wherein each first power switch and each second power switch is configured to be in an activated state or a deactivated state; and
   a plurality of first gate driver circuits respectively coupled to the first power switches and a plurality of second gate driver circuits respectively coupled to the second power switches, wherein the first gate driver circuits in the first phase and the second gate driver circuits in the second phase are configured to operate simultaneously in response to out of phase control signals to provide corresponding gate voltages to activate or deactivate the plurality of first power switches and the plurality of second power switches;
   wherein one of the first gate driver circuits is configured to be connected to positive and negative terminals of a corresponding first flying capacitor in the first phase, configured to receive a voltage at the negative terminal of the corresponding first flying capacitor, and configured to drive a first switch of the first power switches;
   wherein one of the second gate driver circuits is configured to be connected to positive and negative terminals of a corresponding second flying capacitor in the second phase, configured to receive a voltage at the negative terminal of the corresponding second flying capacitor, and configured to drive a second switch of the second power switches.

2. The integrated circuit of claim 1, wherein the first gate driver circuits in the first phase and the second gate driver circuits in the second phase are configured to operate simultaneously in response to out of phase control signals to provide corresponding gate voltages to activate or deactivate the plurality of first power switches and the plurality of second power switches such that each first power switch in the activated state is in an opposite state relative to its corresponding second power switch and that each second power switch in the activated state is in an opposite state relative to its corresponding first power switch, wherein another one of the first gate driver circuits in the first phase is configured to receive an input voltage from a voltage source, and configured to drive a third switch of the first power switches.

3. The integrated circuit of claim 1, wherein another one of the first gate driver circuits in the first phase is configured to receive an output voltage provided to a load, and configured to drive a fourth switch of the first power switches.

4. The integrated circuit of claim 3, wherein the fourth switch is connected to receive a phase voltage in the first phase and is configured to be driven such that a node of the fourth switch selectively connects the phase voltage to a ground voltage.

5. The integrated circuit of claim 1, wherein one or more of the first gate driver circuits include transistors forming a tapered inverter chain comprising a plurality of inverters coupled in series.

6. The integrated circuit of claim 5, wherein a size ratio between inverters in every pair of consecutive inverters in the tapered inverter chain is constant.

7. The integrated circuit of claim 5, wherein for every pair of consecutive inverters in the tapered inverter chain, a subsequent inverter is larger than a previous inverter.

8. The integrated circuit of claim 7, wherein, for every pair of consecutive inverters in the tapered inverter chain, a gate width of the transistors forming the subsequent inverter is larger than a gate width of the transistors forming the previous inverter.

9. The integrated circuit of claim 1, wherein the first switch in the first phase is configured to derive power from the second phase, wherein the one of the first gate driver circuits is configured to receive a voltage at the positive terminal of the corresponding flying capacitor, and wherein the one of the second gate driver circuits is configured to receive a voltage at the positive terminal of the corresponding second flying capacitor.

10. The integrated circuit of claim 1, wherein the first power switches comprise a PMOS transistor coupled to a voltage source configured to provide an input voltage.

11. The integrated circuit of claim 1, wherein the plurality of first gate driver circuits include a cascoded gate driver circuit comprising a first and a second high-side transistors and a first and a second low-side transistors coupled in series.

12. The integrated circuit of claim 11, wherein the cascoded gate driver circuit further comprises a first gate driver coupled to a gate of the first high-side transistor, and a second gate driver coupled to a gate of the second low-side transistor.

13. The integrated circuit of claim 12, wherein the cascoded gate driver circuit further comprises a voltage regulator coupled to a gate of the second high-side transistor and a gate of the first low-side transistor.

14. The integrated circuit of claim 1, wherein the one of the first gate driver circuits further comprises a level shifter circuit.

15. The integrated circuit of claim 1, wherein the one of the first gate driver circuits further comprises a delay circuit.

16. The integrated circuit of claim 1, wherein:
   another one of the first gate driver circuits is configured to be coupled to an output terminal; and
   a supply terminal of another one of the second gate driver circuits is configured to be coupled to a supply terminal of the another one of the first gate driver circuits and to the output terminal.

17. The integrated circuit of claim 1, wherein each of the voltage at the negative terminal of the corresponding first flying capacitor and the voltage at the negative terminal of the corresponding second flying capacitor has a respective voltage level that varies with respect to ground, wherein the charge pump circuit is a step-down charge pump circuit, wherein a negative supply terminal of one of the first gate driver circuits and one of the second gate driver circuits is configured to receive an output voltage at an output terminal, and wherein a positive supply terminal of one of the first gate driver circuits and one of the second gate driver circuits is configured to receive an input voltage from a voltage source.

18. The integrated circuit of claim 1, wherein:
   the plurality of first power switches comprises:

a first set of first power switches configured to operate based on corresponding gate voltages associated with first control signals; and a second set of first power switches configured to operate based on corresponding gate voltages associated with second control signals out of phase with the first control signals;

the plurality of second power switches comprises:

a first set of second power switches configured to operate based on corresponding gate voltages associated with the second control signals, wherein each first power switch of the first set of first power switches corresponds to a respective one second power switch of the first set of second power switches; and a second set of second power switches configured to operate based on corresponding gate voltages associated with the first control signals, wherein each first power switch of the second set of first power switches corresponds to a respective one second power switch of the second set of second power switches.

19. The integrated circuit of claim 18, wherein:

one first power switch of the second set of first power switches is coupled to its corresponding second power switch of the second set of second power switches and to an input terminal; and one first power switch of the first set of first power switches is coupled to its corresponding second power switch of the first set of second power switches and to an output terminal.

20. The integrated circuit of claim 18, wherein the first gate driver circuits in the first phase and the second gate driver circuits in the second phase are configured to operate simultaneously in response to out of phase control signals such that:

in a first state of the integrated circuit:
the first set of first power switches are configured to be in the deactivated state based on the corresponding gate voltages associated with the first control signals;
the second set of first power switches are configured to be in the activated state based on the corresponding gate voltages associated with the second control signals;
the first set of second power switches are configured to be in the activated state based on the corresponding gate voltages associated with the second control signals; and
the second set of second power switches are configured to be in the deactivated state based on the corresponding gate voltages associated with the first control signals; and in a second state of the integrated circuit:
the first set of first power switches are configured to be in the activated state based on the corresponding gate voltages associated with the first control signals;
the second set of first power switches are configured to be in the deactivated state based on the corresponding gate voltages associated with the second control signals;
the first set of second power switches are configured to be in the deactivated state based on the corresponding gate voltages associated with the second control signals; and the second set of second power switches are configured to be in the activated state based on the corresponding gate voltages associated with the first control signals.

21. The integrated circuit of claim 18, wherein the second set of first power switches includes the first switch, and wherein the second set of second power switches includes the second switch.

22. An integrated circuit comprising:

a plurality of gate drivers configured to receive corresponding driver signals; and a plurality of switches respectively connected to and configured to be driven by the plurality of gate drivers, the plurality of switches comprising:

a first switch configured to be driven by a first gate driver of the plurality of gate drivers, and configured to be connected to a first terminal of a first flying capacitor;

a second switch configured to be driven by a second gate driver of the plurality of gate drivers, and configured to be connected between the first terminal of the first flying capacitor and an output terminal for outputting an output voltage;

a third switch configured to be driven by a third gate driver of the plurality of gate drivers, and configured to be connected to the output terminal and to a second terminal of the first flying capacitor, wherein a first supply terminal of the third gate driver is configured to be connected to the first terminal of the first flying capacitor to receive a voltage from the first terminal of the first flying capacitor;

a fourth switch configured to be driven by a fourth gate driver of the plurality of gate drivers, and configured to be connected between the second terminal of the first flying capacitor and a ground terminal;

a fifth switch configured to be driven by a fifth gate driver of the plurality of gate drivers, and configured to be connected to a first terminal of a second flying capacitor;

a sixth switch configured to be driven by a sixth gate driver of the plurality of gate drivers, and configured to be connected between the first terminal of the second flying capacitor and the output terminal;

a seventh switch configured to be driven by a seventh gate driver of the plurality of gate drivers, and configured to be connected to the output terminal and to a second terminal of the second flying capacitor, wherein a first supply terminal of the seventh gate driver is configured to be connected to the first terminal of the second flying capacitor to receive a voltage from the first terminal of the second flying capacitor; and an eighth switch configured to be driven by an eighth gate driver of the plurality of gate drivers, and configured to be connected between the second terminal of the second flying capacitor and the ground terminal.

23. The integrated circuit of claim 22, wherein the first, second, third, and fourth switches are coupled to form a first phase of a charge pump circuit, and the fifth, sixth, seventh, and eighth switches are coupled to form a second phase of the charge pump circuit, wherein the first phase of the charge pump circuit is configured to be operated simultaneously and out of phase with the second phase of the charge pump circuit such that the first and fifth switches are configured to be driven out of phase with respect to each other and the third and seventh switches are configured to be driven out of phase with respect to each other.

24. The integrated circuit of claim 22, wherein a first supply terminal of the fourth gate driver is configured to be connected to the output terminal, and a second supply terminal of the fourth gate driver is configured to be connected to the ground terminal, and wherein a first supply terminal of the eighth gate driver is configured to be connected to the output terminal, and a second supply terminal of the eighth gate driver is configured to be connected to the ground terminal.

25. The integrated circuit of claim 22, wherein a second supply terminal of the third gate driver is configured to be connected to the second terminal of the first flying capacitor, and wherein a second supply terminal of the seventh gate driver is configured to be connected to the second terminal of the second flying capacitor.

26. The integrated circuit of claim 22, wherein one or more of the gate drivers include transistors forming a tapered inverter chain comprising a plurality of inverters coupled in series, wherein each of the inverters comprises a high-side transistor and a low-side transistor connected in series between two supplying terminals, wherein the low-side transistor is an NMOS device, and wherein the high-side transistor is a PMOS device sized larger than the NMOS device.

27. The integrated circuit of claim 26, wherein for every pair of consecutive inverters in the tapered inverter chain, a subsequent inverter is larger than a previous inverter.

28. The integrated circuit of claim 22, wherein the first, second, third, and fourth switches are coupled to form a first phase of a charge pump circuit, and the fifth sixth, seventh, and eighth switches are coupled to form a second phase of the charge pump circuit, wherein the first phase of the charge pump circuit is configured to be operated simultaneously and substantially out of phase with the second phase of the charge pump circuit, and wherein each of the voltage at the first terminal of the first flying capacitor and the voltage at the first terminal of the second flying capacitor has a respective voltage level that varies with respect to ground.

29. The integrated circuit of claim 28, wherein the first phase of the charge pump circuit is configured to be operated simultaneously and approximately 180° out of phase with the second phase of the charge pump circuit.

30. The integrated circuit of claim 22, wherein a positive supply terminal of the fourth gate driver and the eighth gate driver is configured to receive an output voltage at the output terminal, and wherein a positive supply terminal of the first gate driver and the fifth gate driver is configured to receive an input voltage from a voltage source.

* * * * *

UNITED STATES PATENT AND TRADEMARK OFFICE
CERTIFICATE OF CORRECTION

Page 1 of 2

PATENT NO. : 12,212,232 B2
APPLICATION NO. : 18/544466
DATED : January 28, 2025
INVENTOR(S) : David Giuliano, Gregory Szczeszynski and Raymond Barrett, Jr.

It is certified that error appears in the above-identified patent and that said Letters Patent is hereby corrected as shown below:

In the Specification

In the CROSS REFERENCE:

Column 1, Lines 7-8 change "U.S. Application Ser. No." to --U.S. Application No.--.

Column 1, Line 9 change "U.S. Application Ser. No." to --U.S. Application No.--.

Column 1, Line 11 change "U.S. Application Ser. No." to --U.S. Application No.--.

Column 1, Line 14 change "U.S. Application Ser. No." to --U.S. Application No.--.

Column 1, Line 16 change "U.S. Application Ser. No." to --U.S. Application No.--.

Column 1, Lines 18-19 change "U.S. Application Ser. No." to --U.S. Application No.--.

Column 1, Line 21 change "U.S. Application Ser. No." to --U.S. Application No.--.

Column 1, Lines 23-24 change "U.S. Application Ser. No." to --U.S. Application No.--.

Column 1, Line 26 change "U.S. Application Ser. No." to --U.S. Application No.--.

In the DETAILED DESCRIPTIONS:

Column 8, Line 14 change "transistors MOA-MSA," to --transistors M0A-M5A,--.

Column 11, Line 41 change "corresponding transistors M4C, MBC," to --corresponding transistors M4C, M8C,--.

Signed and Sealed this
Twenty-fifth Day of February, 2025

Coke Morgan Stewart
*Acting Director of the United States Patent and Trademark Office*

Column 12, Lines 58-59 change "the transistors MOA-M3B derive power" to --the transistors M0A-M3B derive power--.